United States Patent
Wagner

(10) Patent No.: US 9,622,427 B2
(45) Date of Patent: Apr. 18, 2017

(54) HYDROPONIC SYSTEM FOR GROWING PLANTS

(71) Applicant: Daniel Davidson Wagner, San Clemente, CA (US)

(72) Inventor: Daniel Davidson Wagner, San Clemente, CA (US)

(*) Notice: Subject to any disclaimer, the term of this patent is extended or adjusted under 35 U.S.C. 154(b) by 0 days.

(21) Appl. No.: 14/548,155

(22) Filed: Nov. 19, 2014

(65) Prior Publication Data

US 2016/0135394 A1  May 19, 2016

(51) Int. Cl.
*A01G 31/00* (2006.01)
*A01G 31/02* (2006.01)

(52) U.S. Cl.
CPC ............ *A01G 31/02* (2013.01); *Y02P 60/216* (2015.11)

(58) Field of Classification Search
CPC . A01G 9/12; A01G 31/02; A01G 9/02; A01G 31/00; A01K 63/04
USPC .... 52/47, 62 R, 82, 83; 47/47, 62 R, 82, 83, 47/39
See application file for complete search history.

(56) References Cited

U.S. PATENT DOCUMENTS

| | | | | |
|---|---|---|---|---|
| 2,152,869 A * | 4/1939 | Campbell | ................ | A47G 7/00 47/41.01 |
| 5,381,625 A * | 1/1995 | Wente | .................... | A01G 9/022 47/82 |
| 2003/0089037 A1* | 5/2003 | Ware | ....................... | A01G 31/02 47/83 |
| 2006/0032122 A1* | 2/2006 | Chang | .................. | A01G 9/1013 47/58.1 SE |
| 2006/0032128 A1* | 2/2006 | Bryan | .................... | A01G 31/06 47/62 R |
| 2015/0223418 A1* | 8/2015 | Collins | .................. | A01G 31/02 47/62 R |

* cited by examiner

*Primary Examiner* — William Gilbert
(74) *Attorney, Agent, or Firm* — Pia Anderson Moss Hoyt

(57) ABSTRACT

A hydroponics plant growing system comprises a bamboo tower having a grow chamber and a water chamber formed therein. A plurality of grow cups are attached to side of the tower adjacent the grow chamber. Cutouts in a sidewall of the tower form passageways between the grow cups and grow chamber. A low voltage electric pump is disposed in the water chamber to pump water to the top of the grow chamber.

19 Claims, 25 Drawing Sheets

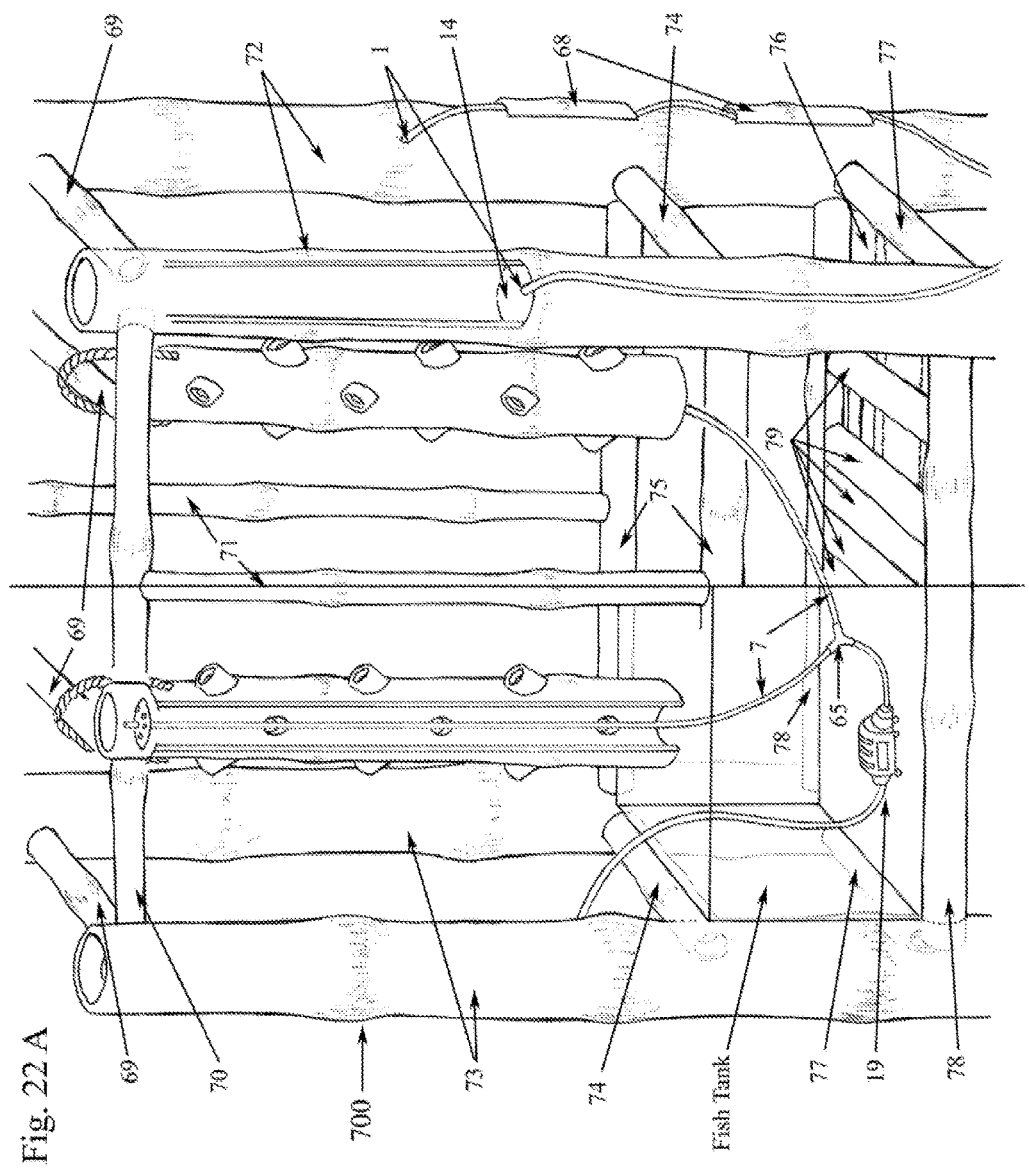

HYDROPONIC SYSTEM FOR GROWING PLANTS

CROSS-REFERENCE TO RELATED APPLICATIONS

This application claims the benefit of U.S. Provisional Application No. 61/906,314, filed Nov. 19, 2013, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Present Disclosure

The present disclosure relates generally to hydroponics, and more particularly, but not necessarily entirely, to systems and methods for growing plants hydroponically in an aqueous nutrient solution.

2. Description of Related Art

Hydroponics is a method of growing plants using mineral nutrient solutions, in water, without soil. In the past, most previously available hydroponics systems were formed of plastic, such a PVC. However, the use of plastics to construct hydroponic grow systems is undesirable as there is growing evidence that plastics may leach toxic chemicals into the water used by the plants. In turn, it is believed that these toxic chemicals may make there way into the parts of the plants that are consumed by humans. Thus, it would be an improvement over the prior art to provide a hydroponic growing system that eliminates or reduces the use of plastic.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIGS. 13-15B depict a tower stand according to embodiments of the present disclosure;

DETAILED DESCRIPTION

Figure 1:
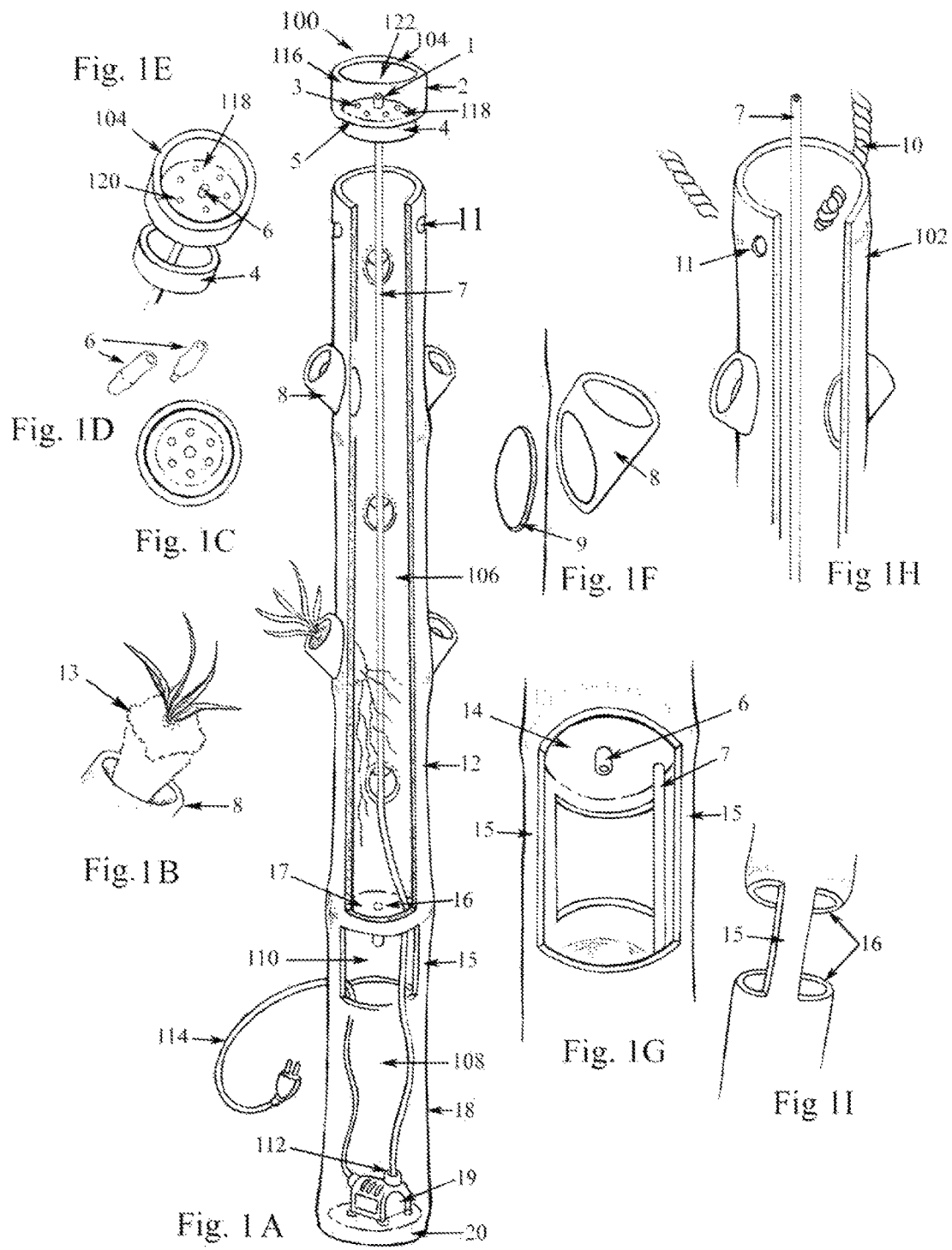
FIG. 1A depicts a vertical bamboo grow tower according to an embodiment of the present disclosure.
FIG. 1B depicts a grow cup for the vertical bamboo grow tower according to an embodiment of the present disclosure.
FIG. 1C depicts a top cap for the vertical bamboo grow tower according to an embodiment of the present disclosure.
FIG. 1D depicts down spouts for the vertical bamboo grow tower according to an embodiment of the present disclosure.
FIG. 1E depicts an exploded view of the top cap of the vertical bamboo grow tower according to an embodiment of the present disclosure.
FIG. 1F depicts a grow cup and the vertical bamboo grow tower according to an embodiment of the present disclosure.
FIG. 1G depicts a watering and access window of the vertical bamboo grow tower according to an embodiment of the present disclosure.
FIG. 1H depicts a handing cord for the vertical bamboo grow tower according to an embodiment of the present disclosure.
FIG. 1I depicts a side view of the watering and access window of the vertical bamboo grow tower according to an embodiment of the present disclosure.
Figure 2:
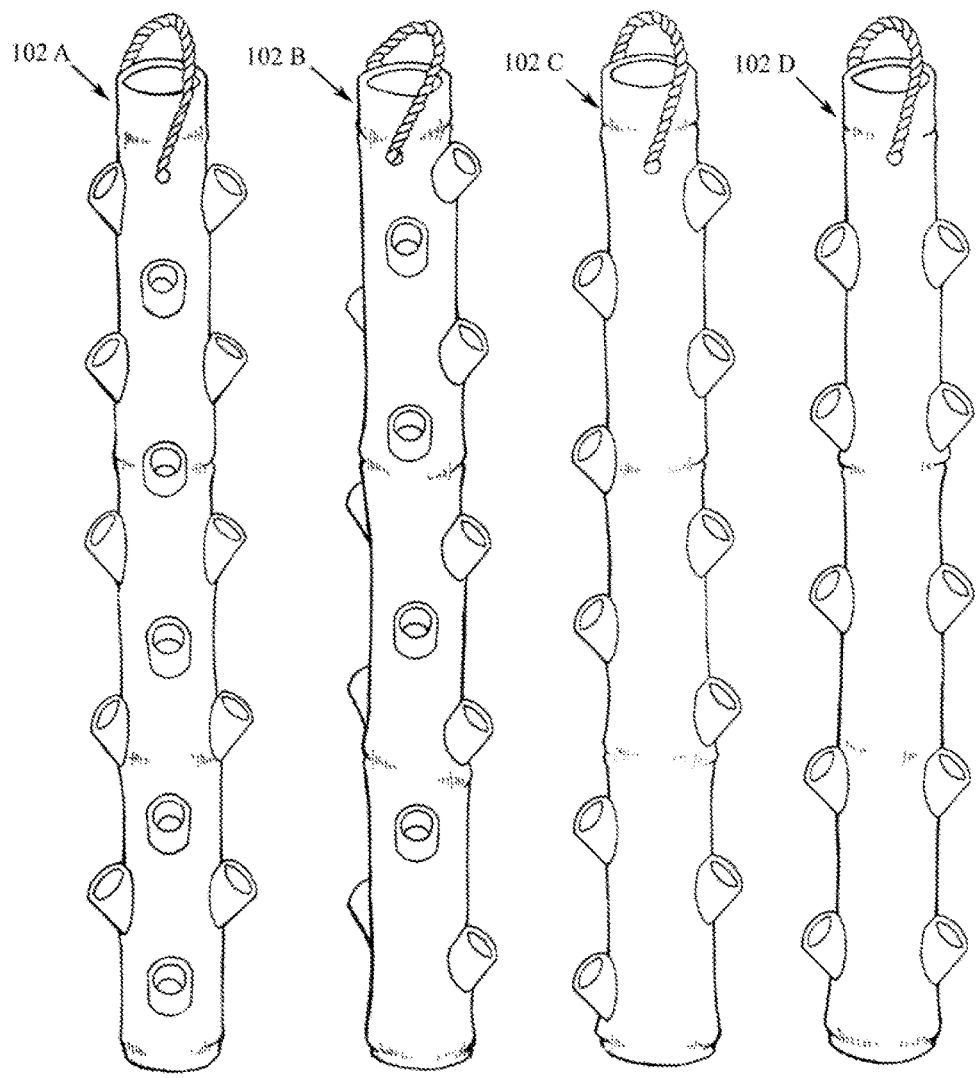
FIG. 2A depicts a vertical bamboo grow tower according to an embodiment of the present disclosure.
FIG. 2B depicts a vertical bamboo grow tower according to an embodiment of the present disclosure.
FIG. 2C depicts a vertical bamboo grow tower according to an embodiment of the present disclosure.
FIG. 2D depicts a vertical bamboo grow tower according to an embodiment of the present disclosure.
Figures 3A, 3B, 3C, 3D:
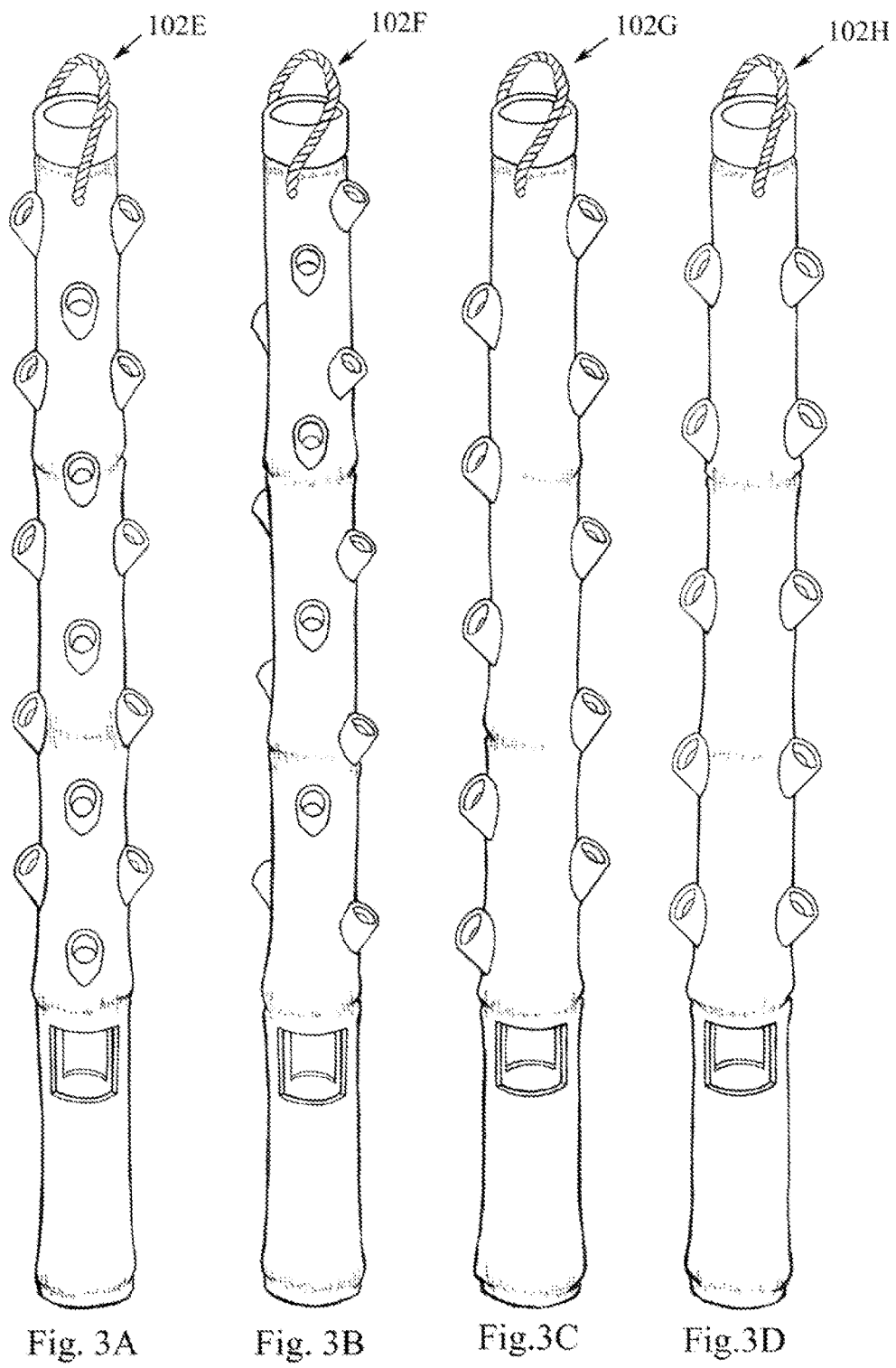
FIG. 3A depicts a vertical bamboo grow tower according to an embodiment of the present disclosure.
FIG. 3B depicts a vertical bamboo grow tower according to an embodiment of the present disclosure.
FIG. 3C depicts a vertical bamboo grow tower according to an embodiment of the present disclosure.
FIG. 3D depicts a vertical bamboo grow tower according to an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "containing," "having," "characterized by," and grammatical equivalents thereof are inclusive or open-ended terms that do not exclude additional, unrecited elements or method steps.

Further, the basic parts of a bamboo plant will be understood as follows for purposes of the present disclosure. The main stalk of a bamboo is called a "culm" or "stem." The stem is the support structure for the branches and leaves of a bamboo plant and contains the main vascular system for the transport of water, nutrients and food. The stem is made up of jointed segments. The joints of the stem are called "nodes" and the area between two adjacent nodes are called an "internodes." The nodes of a bamboo plant are typically solid.

Turning now to the present disclosure, applicant has discovered a hydroponic system for growing plants that is constructed from the stems of bamboo plants. In particular, the present invention may provide a vertical growing tower formed entirely of bamboo. The tower may include one or more grow cups attached to the sidewall of the tower that are designed to receive grow plugs. The grow plugs may be pre-formed to fit within the grow cups. The grow plugs may be made from natural materials and form a base for holding a growing plant. In this regard, a seed or a seedling may be "planted" into a grow plug. A hollow cutout in the tower sidewall may lead from the grow cups into the interior of the tower such that the roots of the plants may extend into the interior, hollow passageway of the tower.

The tower may further include its own self-contained water chamber. Disposed in the water chamber is a pump for pumping water to the top of the tower. Water pumped to the top of the tower is allowed to drip into the interior of the tower and onto the roots of the plants in the grow cups.

Referring now to FIGS. 1A-1I, there is depicted a bamboo vertical tower system 100 and its various components according to an embodiment of the present disclosure. The system 100 may include a tower 102 having a hollow passageway 103 formed therein. The tower 102 may define a grow chamber 106 and a water chamber 108. The grow chamber 106 may include an outer wall 12. The water chamber 108 may include an outer wall 18.

A node 17 may separate the grow chamber 106 and the water chamber 108 in the hollow passageway 103. The water chamber 108 may extend from a bottom node 20 to the middle node 17. The grow chamber 106 may extend from the node 17 to a top rim 105 of the tower 102.

Access windows 110 may be cut into the tower 102 just below the node 17 to form pillars 15. The windows 110 may include rims 16. The windows 110 may allow water to be poured into the water chamber 108. In addition, a low voltage water pump 112 may be placed into the water chamber 108 through the windows 110. A power cord 114 for the pump 112 may extend from the water chamber 108 outside of the tower 102 through one of the windows 110.

Grow cups 8 may be attached to an outer sidewall of the tower 102 adjacent the grow chamber 106. The grow cups 8 may be formed of bamboo. Cutouts or holes 9 in the sidewall of the tower 102 may interconnect the grow chamber 106 to the grow cups 8. Each of the grow cups 8 may be configured and adapted to receive a grow plug 13. In an embodiment, the grow plugs 13 may be formed of a natural material, such a sponge or fibers. The grow plugs 13 may be pre-formed or pre-molded to fit within the grow cups 8. It will be appreciated that the grow plugs 13 may serve as a base material for a seed or seedling. That is, the grow plugs 13 operate to hold plants within the grow cups 8. The grow cups 8 may be adhered to the sidewall of the tower 102 using an adhesive. In addition, the grow cups 8 may engage the holes 9 in a friction or press fit.

A bamboo cap 104 may be configured and adapted to be installed onto the top rim 105 of the tower 102. The cap 104 may include an annular sidewall 116 extending upwardly from a node 118. The annular sidewall 116 and the node 118 may form a small water chamber 122 in the top of the cap 104. (The purpose of the water chamber 122 will be described below.) A top surface 5 of the node 118 may naturally form a dome. A plurality of holes 3 may be formed in the node 118. The holes 3 may are configured and adapted for receiving down spouts 6 as perhaps best seen in FIG. 1E. The down spouts 6 allow water in the water chamber 122 to drip into the grow chamber 106 of the tower 102. The down spouts 6 may be formed of bamboo or some other material, such as metal or plastic.

Attached to the bottom surface of the node 118 is a flange 4. The flange 4, which may be formed of bamboo, has a diameter to fit within the hollow passageway 103. The flange 4 may prevent the cap 104 from sliding off of the tower 102. The flange 4 may be adhered to the bottom of the node 118 or otherwise attached.

Extending from the pump 112 to the water chamber 122 is a tube 7. In this regard, the tube 7 may pass through holes in the nodes 17 and 118. Water pumped through the tube 7 fills the water chamber 122 with water from the water chamber 108. The water then drips through down spouts 6 into the grow chamber 106 and onto the roots of the plants in the grow cups 8. A down spout 6 may also be installed through a bottom surface 14 of the node 17 such that the water collected in the bottom of the grow chamber 106 drips back into the water chamber 108.

As seen in FIG. 1H, holes 11 may be formed in the top of the tower 102. The holes 11 may be utilized to attach a cord 10 to the tower 102. The cord 11 may be utilized to vertically hang the tower 102 from a structure or stand. It will be appreciated that the cord 11 may be one of rope, wire, cable or any other suitable flexible member.

Referring to FIGS. 2A-2D, there are depicted embodiments of towers 102A, 102B, 102C, and 102D, respectively. The towers 102A-102D may not have a bottom water chamber like the tower 102 shown in FIGS. 1A-1I. Instead, water may be poured or pumped by a user into their respective caps.

Referring to FIGS. 3A-3D, there are depicted embodiments of towers 102E, 102F, 102G, and 102H with a bottom water chamber and showing various configurations of the growing cups 8 disposed along the outer sidewall of the respective grow chambers.

Figure 4:
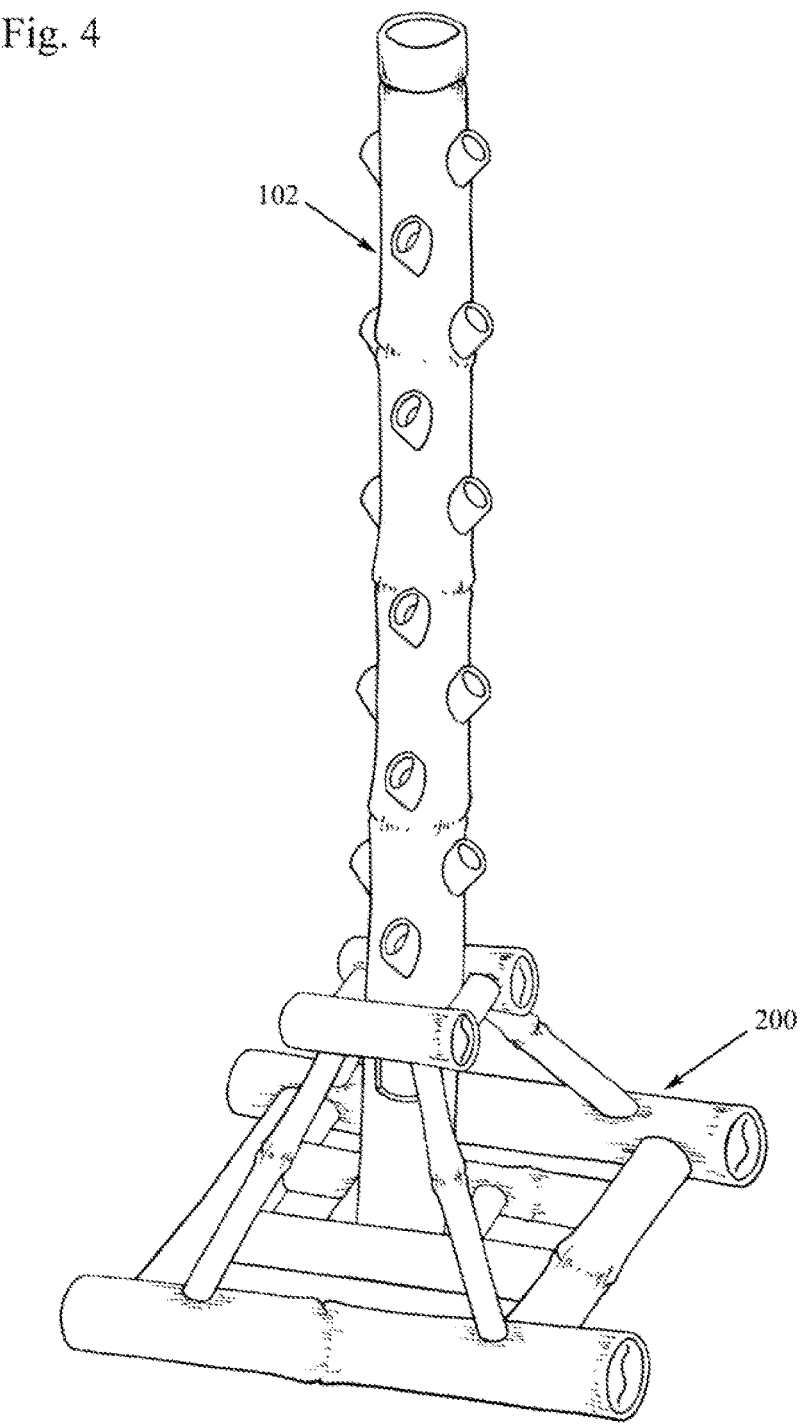
FIG. 4 depicts a vertical bamboo grow tower in a stand according to embodiments of the present disclosure.
Figure 5:
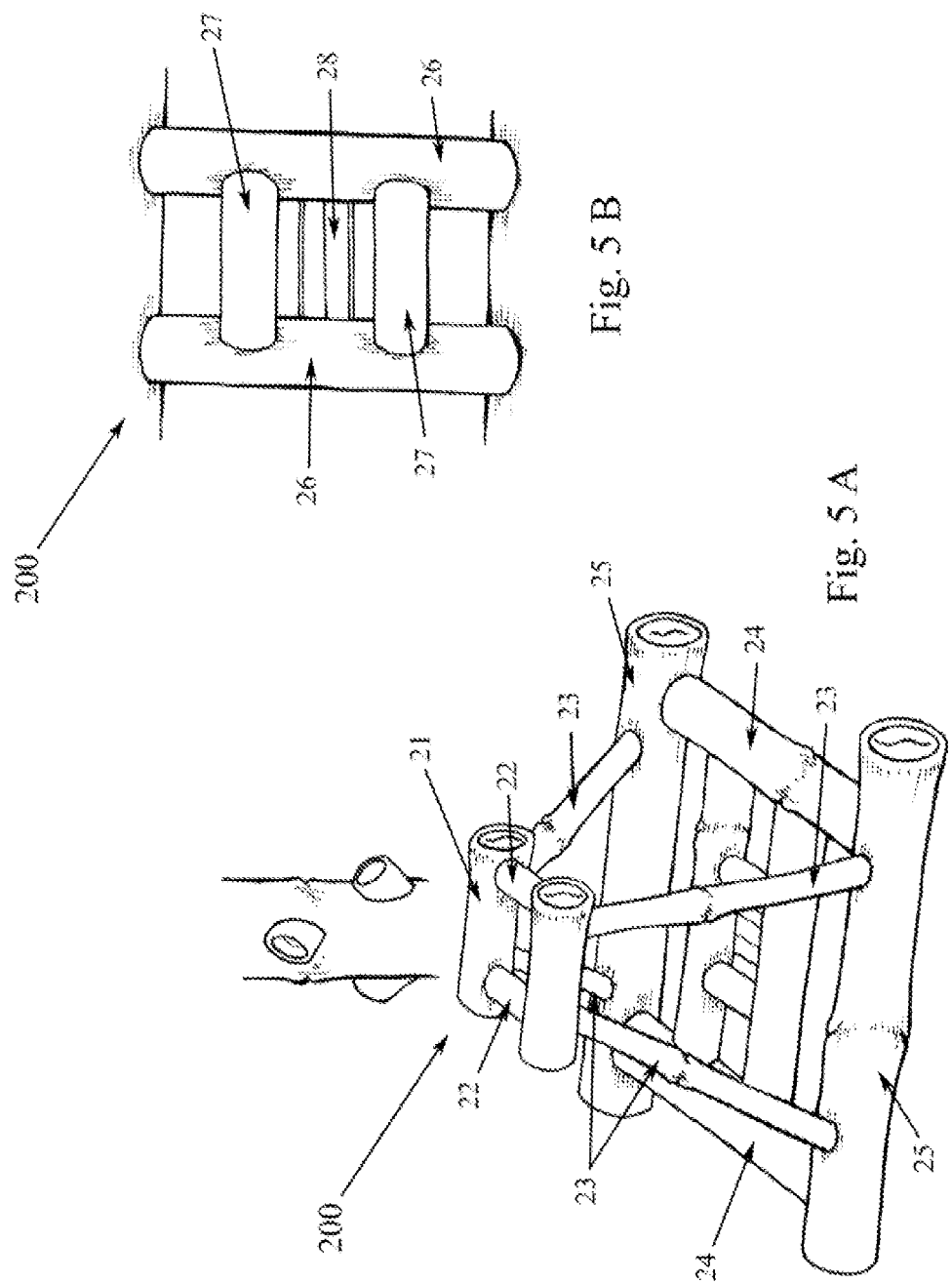
FIG. 5A depicts a stand for a vertical bamboo grow tower in a stand according to embodiments of the present disclosure.
FIG. 5B depicts a stand portion for a vertical bamboo grow tower in a stand according to embodiments of the present disclosure.
Figure 6:
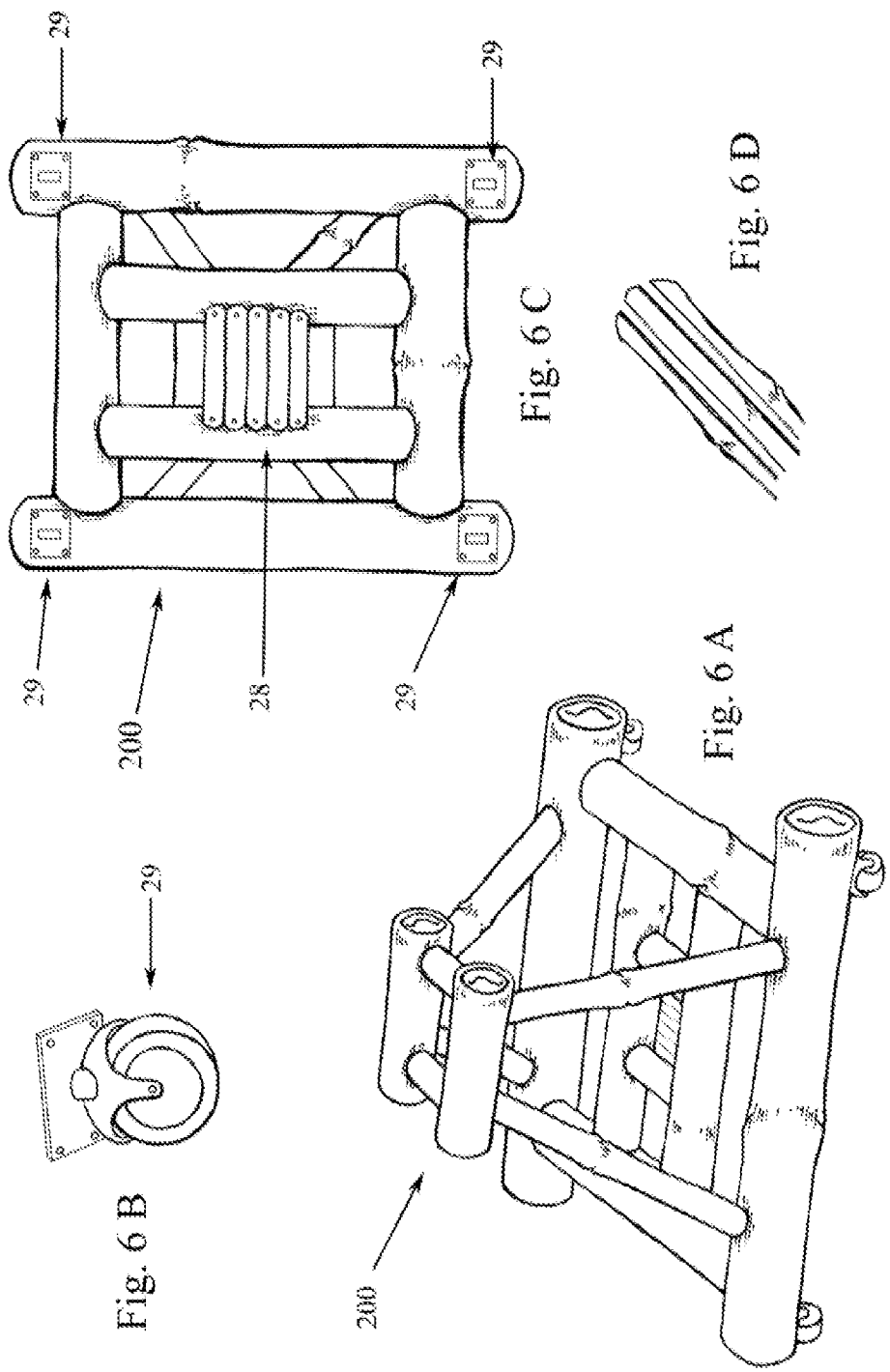
FIG. 6A depicts a stand for a vertical bamboo grow tower in a stand according to embodiments of the present disclosure.
FIG. 6B depicts a wheel assembly for a vertical bamboo grow tower in a stand according to embodiments of the present disclosure.
FIG. 6C depicts a bottom view of the stand for a vertical bamboo grow tower in a stand according to embodiments of the present disclosure.
FIG. 6D depicts a bamboo post for a vertical bamboo grow tower in a stand according to embodiments of the present disclosure.

Referring now to FIG. 4, there is shown the tower 102 mounted in a stand 200. Referring to FIGS. 5A and 5B, the stand 200 may include top members 21, top members 22, angle members 23, foundation members 24, foundation members 25, foundation cross pieces 26, foundation cross pieces 27, and floor strips 28. Referring to FIGS. 6A, 6B, 6C, and 6D the stand 200 may be mounted onto casters 29.

Figure 7:
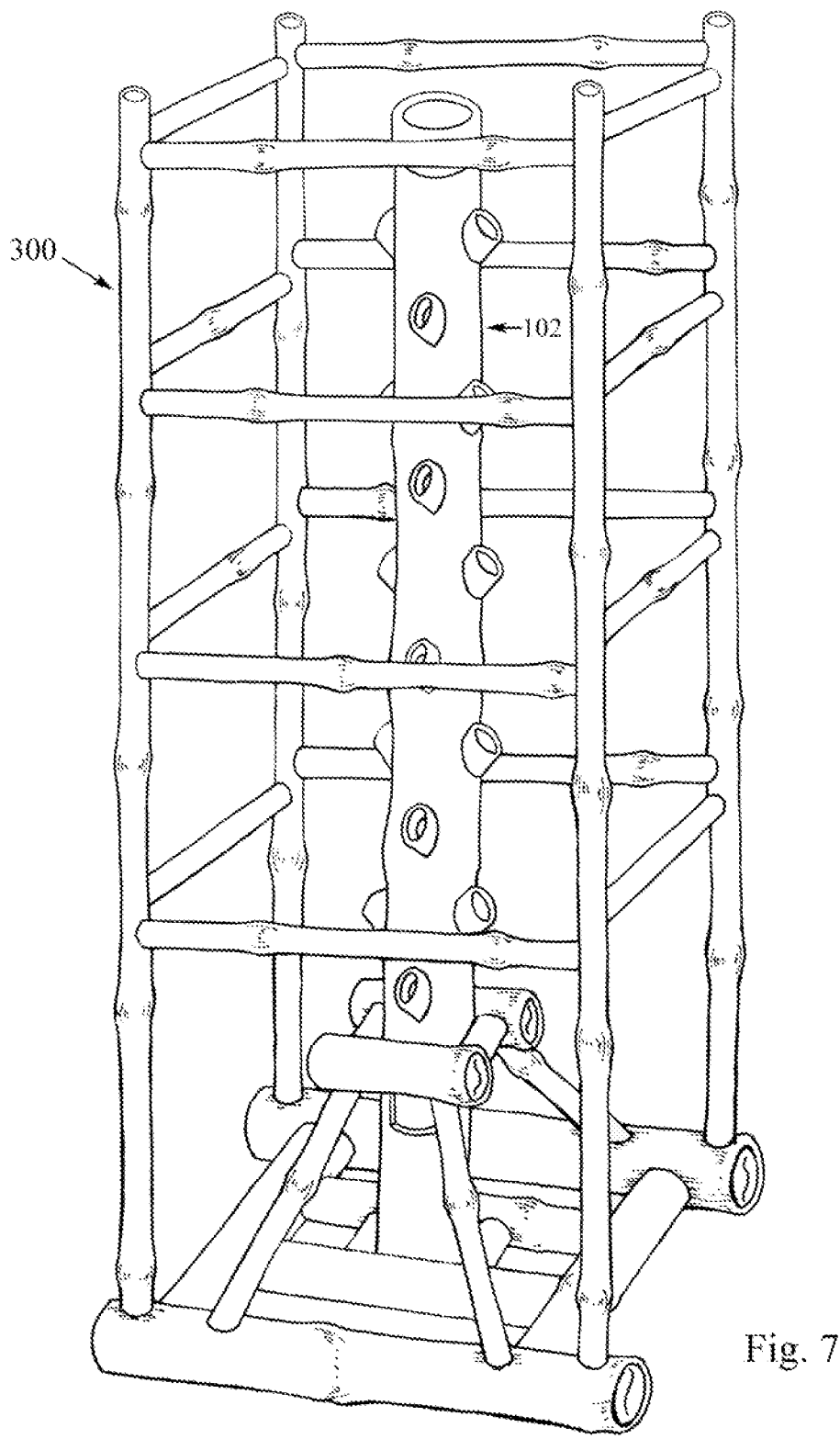
FIG. 7 depicts a stand for a vertical bamboo grow tower according to embodiments of the present disclosure.
Figure 8:
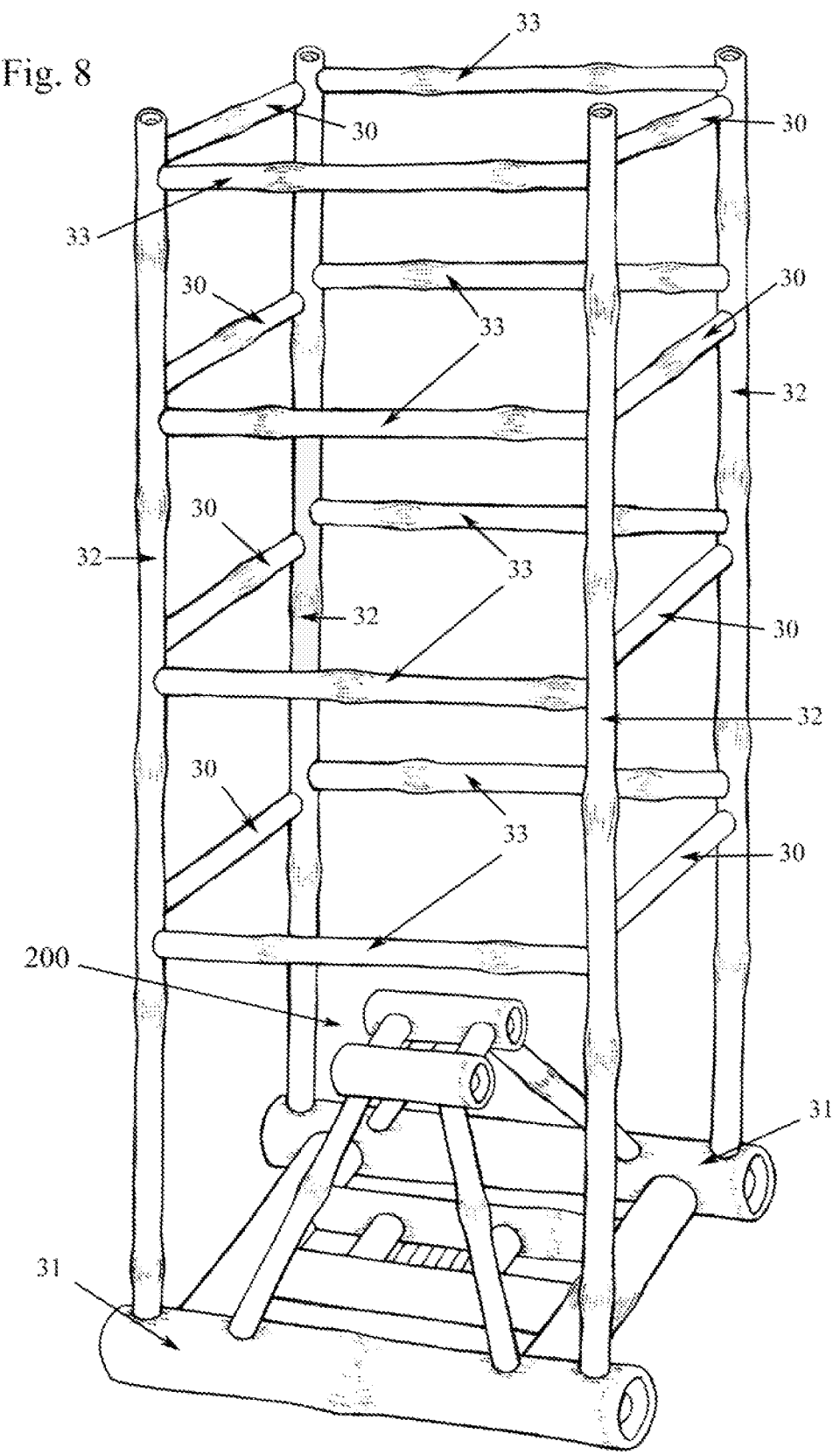
FIG. 8 depicts a stand for a vertical bamboo grow tower according to embodiments of the present disclosure.

Referring now to FIG. 7, the tower 102 may be mounted onto stand 300. Referring now to FIG. 8, the stand 300 may comprise cross members 30, foundation members 31, pole members 32, and cross members 33. The stand 300 may further include a base member 200A that is similar to the stand 200.

Figure 9:
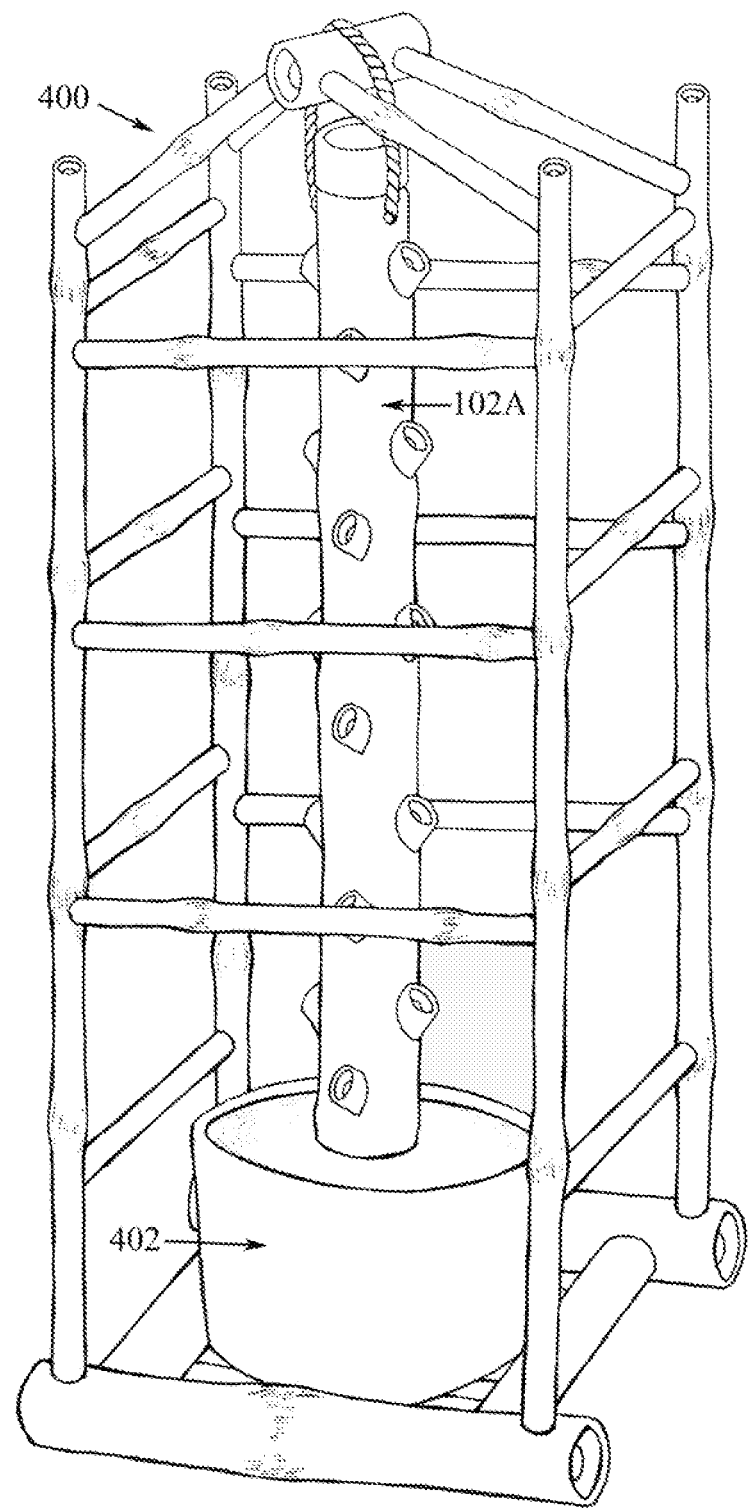
FIG. 9 depicts a stand for a vertical bamboo grow tower according to embodiments of the present disclosure.
Figure 10:
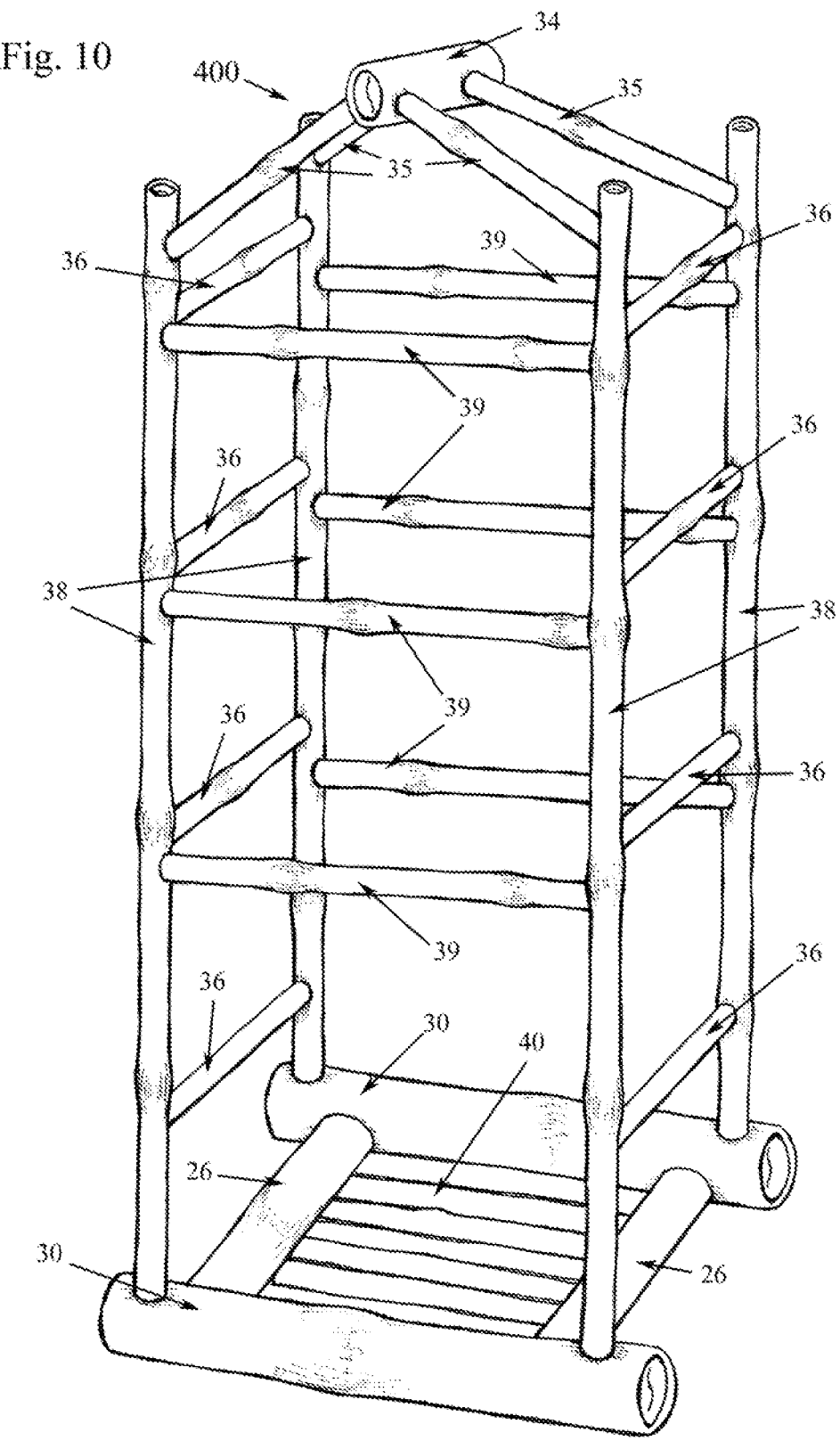
FIG. 10 depicts a stand for a vertical bamboo grow tower according to embodiments of the present disclosure.
Figure 11:
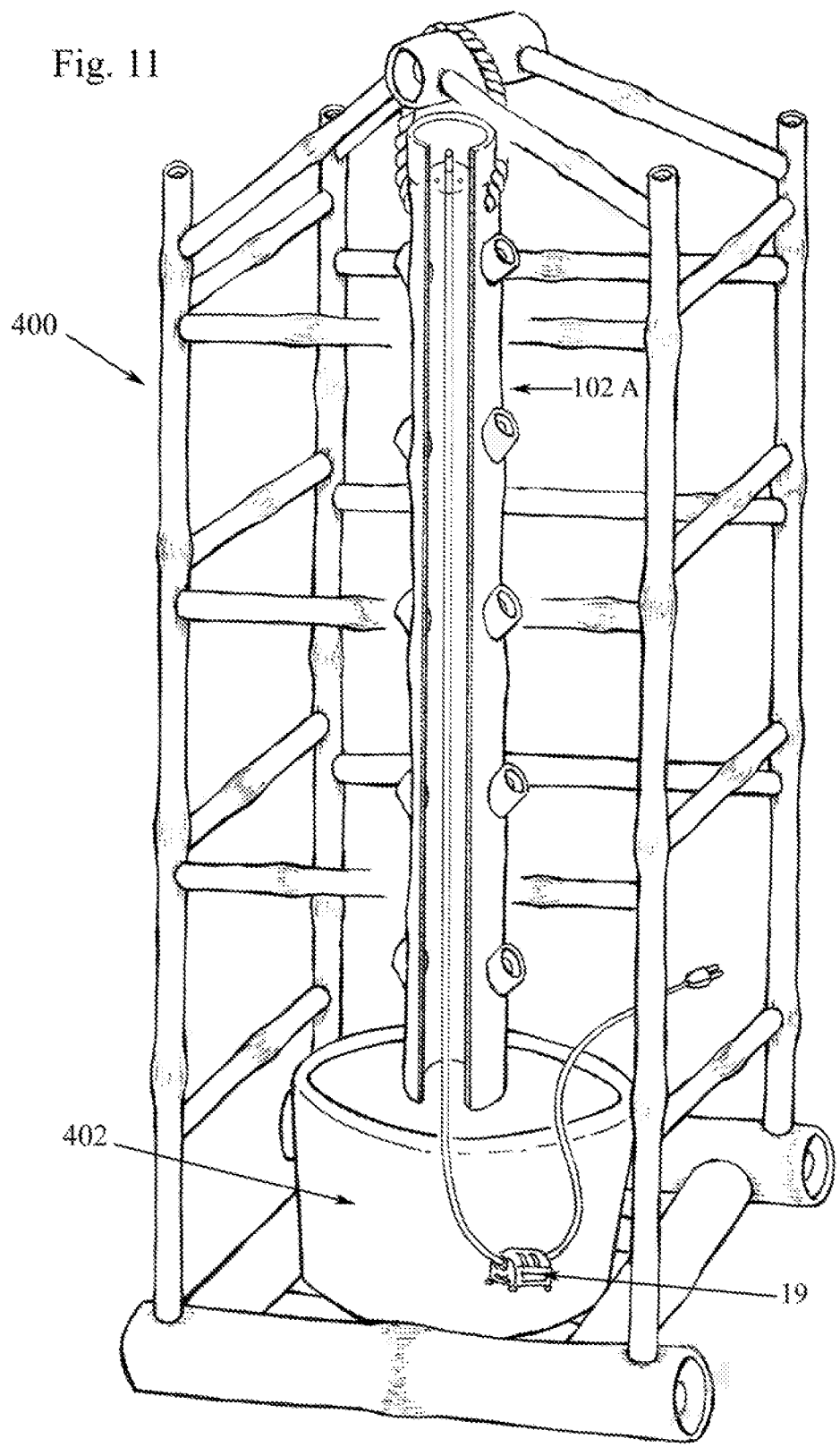
FIG. 11 depicts a stand for a vertical bamboo grow tower according to embodiments of the present disclosure.

Referring to FIGS. 9 and 11, the tower 102A may be hung from a stand 400 over a pot 402 as shown. A pump 19 may be installed into the pot 402 and may pump water into the top of the tower 102A. Water may drain from the tower 102A into the pot 402. Referring to FIG. 10, the stand 400 may include a hanging bar 34, angle poles 35, cross members 36, foundation pieces 26, cross member pieces 30, vertical poles 38, cross member pieces 39, and platform strips 40.

Figure 12:
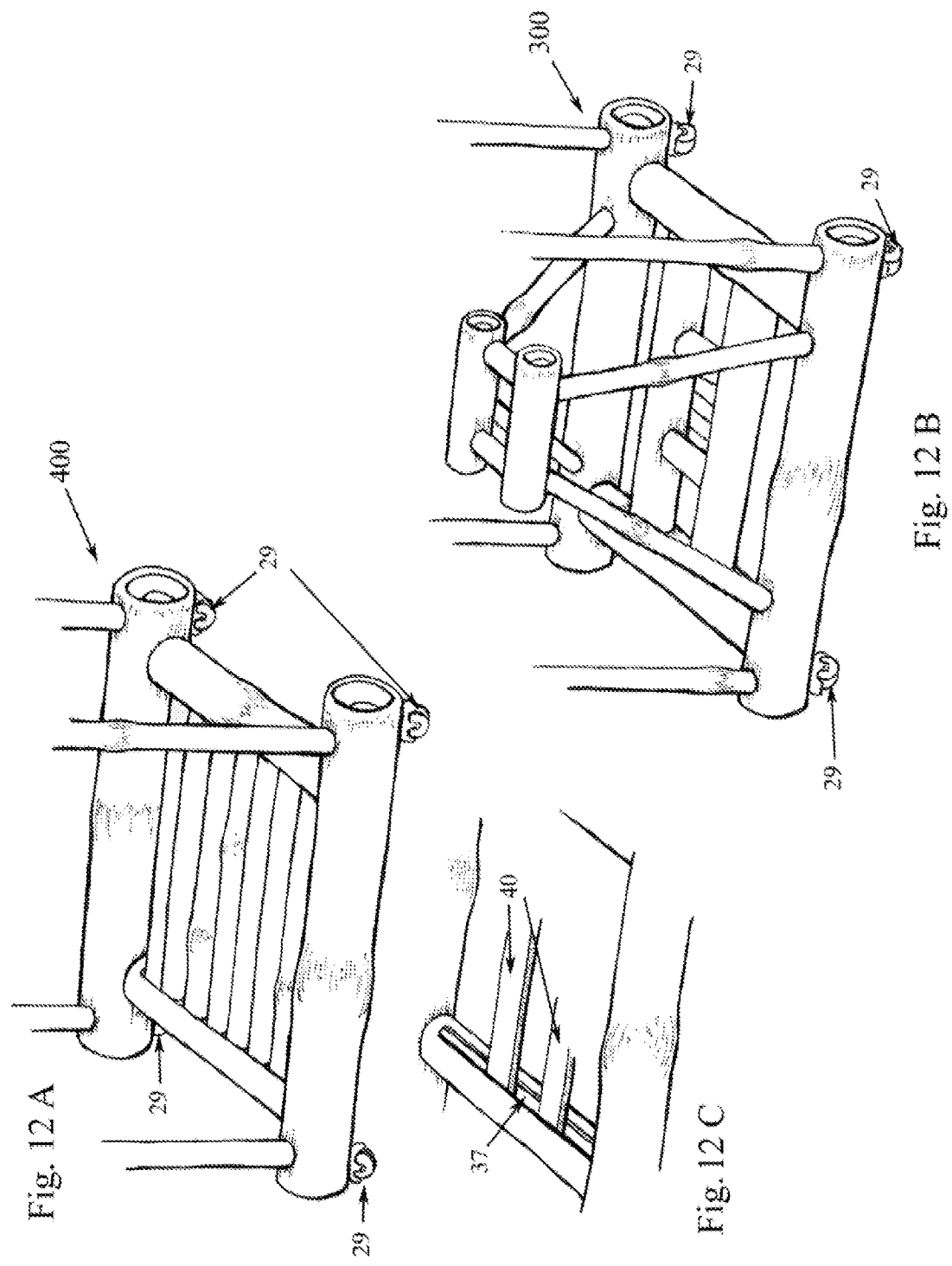
FIGS. 12A, 12B and 12C depict tower stand bottom portions according to embodiments of the present disclosure.

FIGS. 12A and 12B shows casters 29 mounted onto the stands 400 and 300, respectively.

Figure 13:
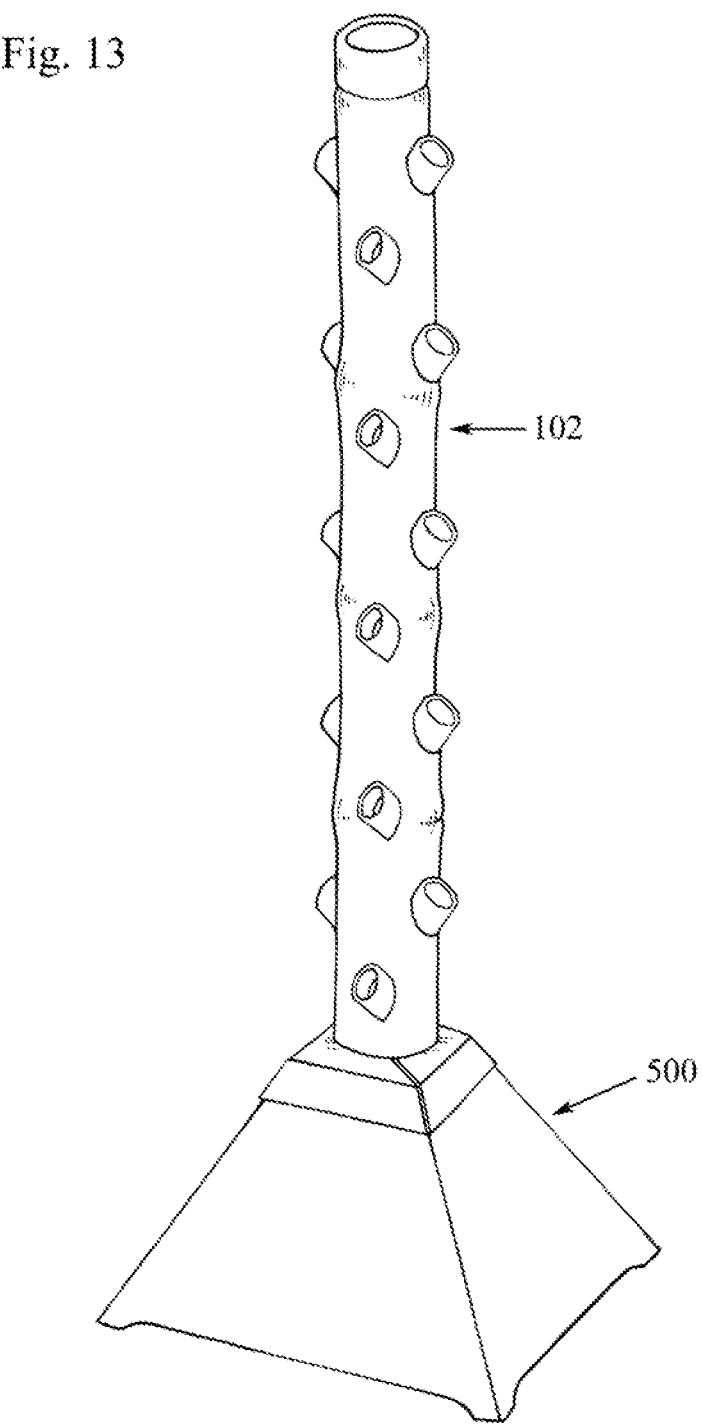
Figure 14:
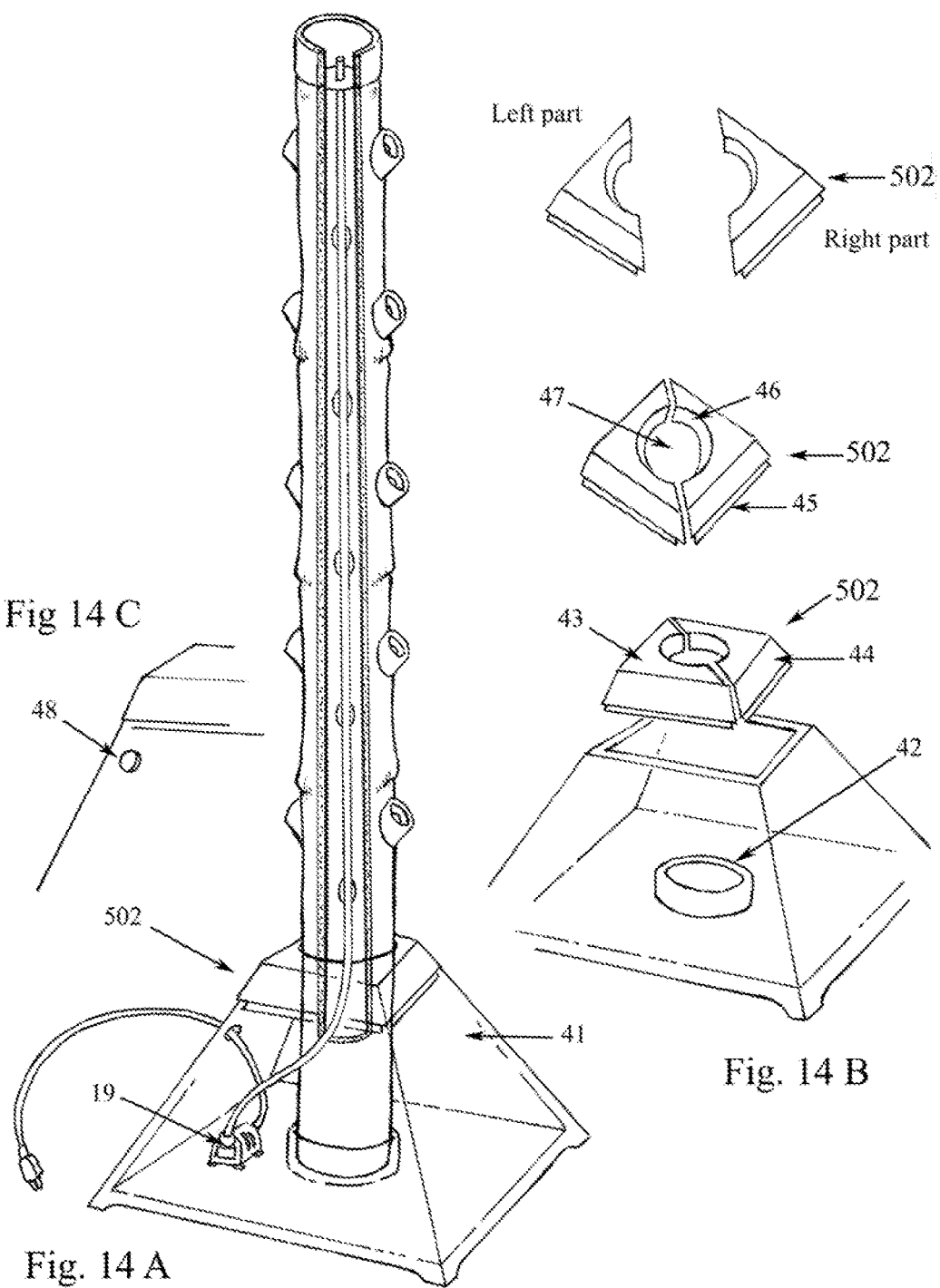

FIGS. 13, 14A and 14B depict the tower 102 mounted into a base 500. The base 500 may be a clay pot 41 that defines a water chamber. Formed in the water chamber may be a clay flange tower stabilizer 42. A pot cap 502 may include a left part and a right part. The cap 502 may include a top 43, an angled side 44, a flange 45, an annular tower engagement portion 46 that defines a hole 47 for receiving the tower 102.

Figure 15:
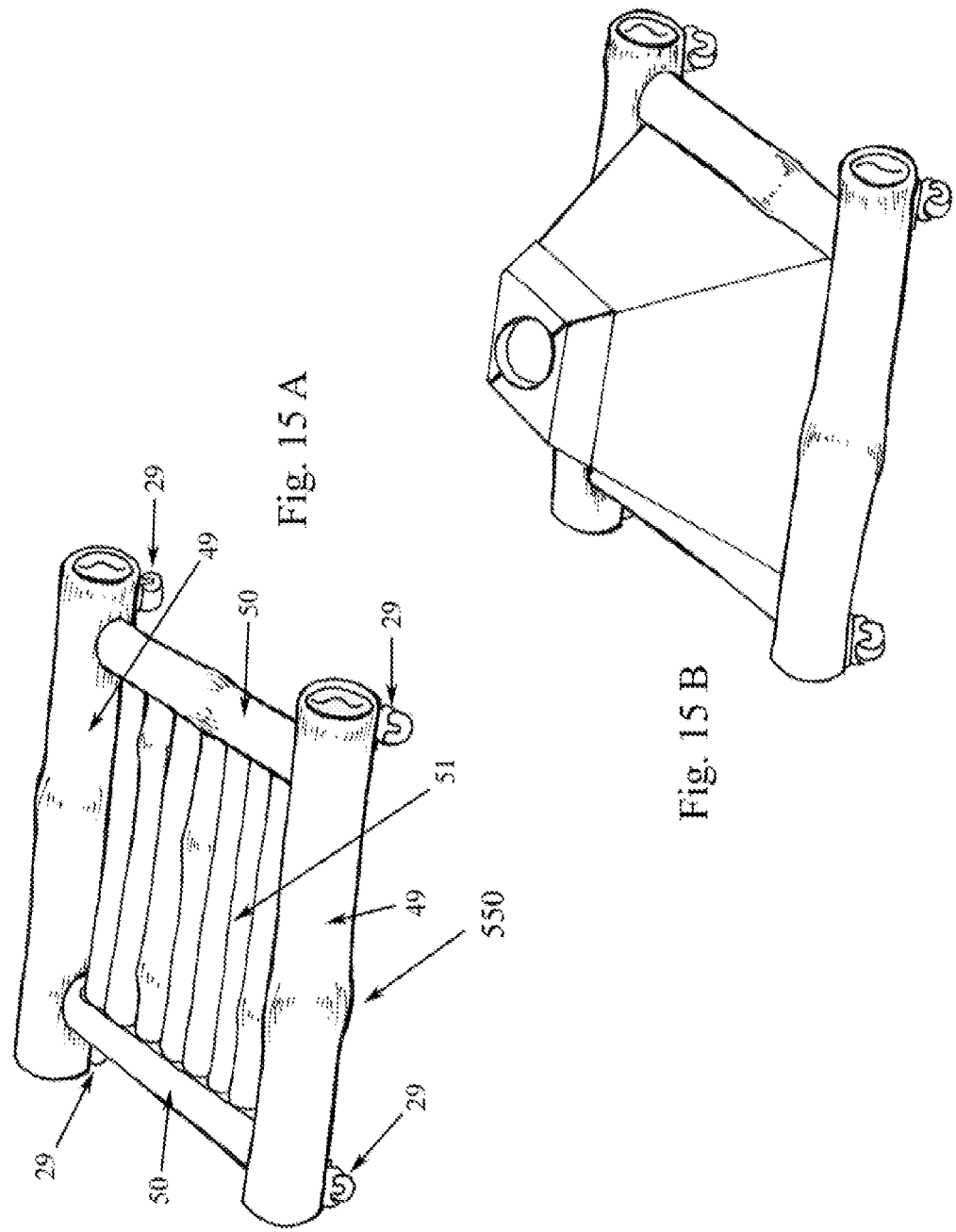
Figure 16:
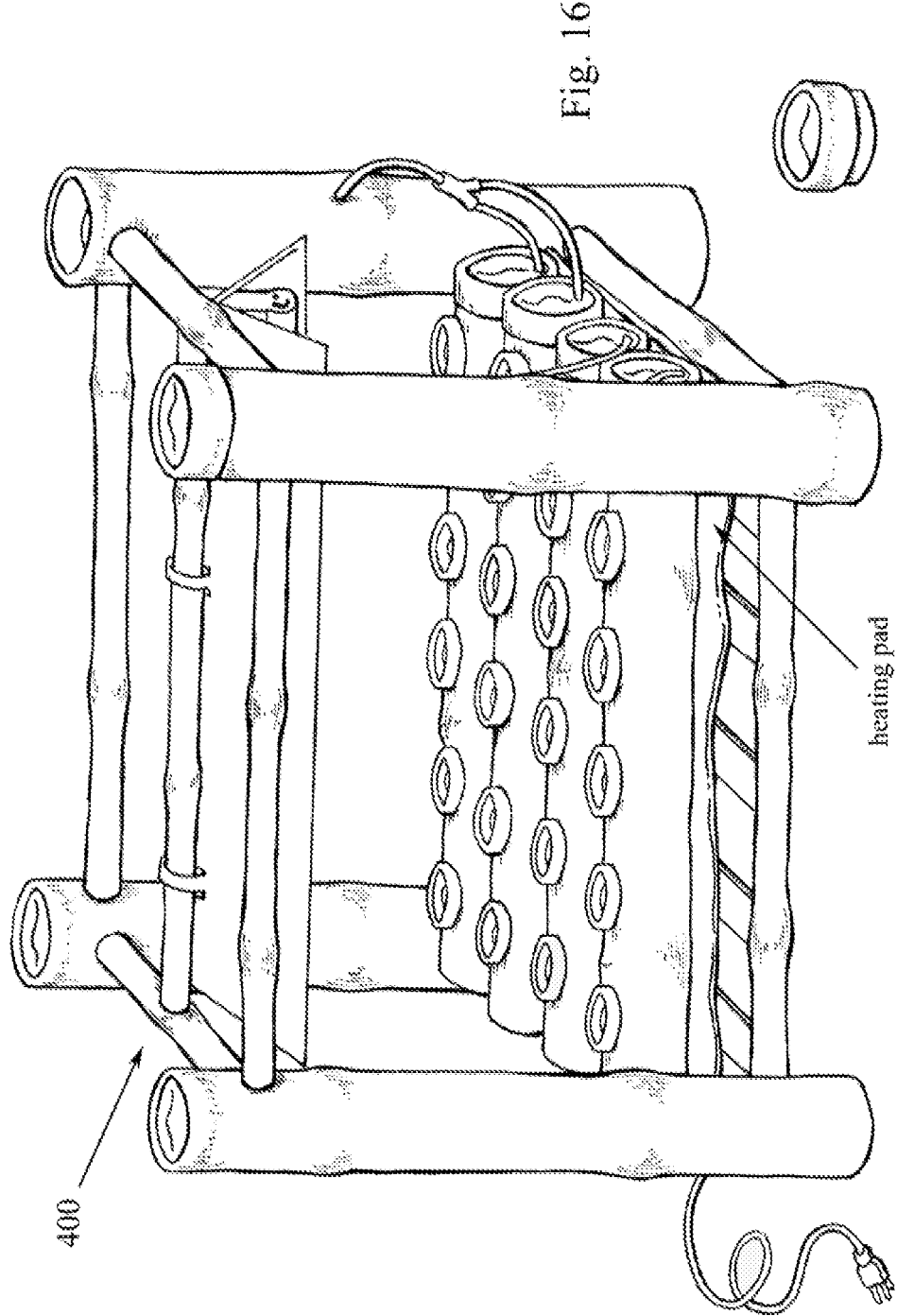
FIG. 16 depicts a vertical bamboo grow tower according to an embodiment of the present disclosure.
Figure 17:
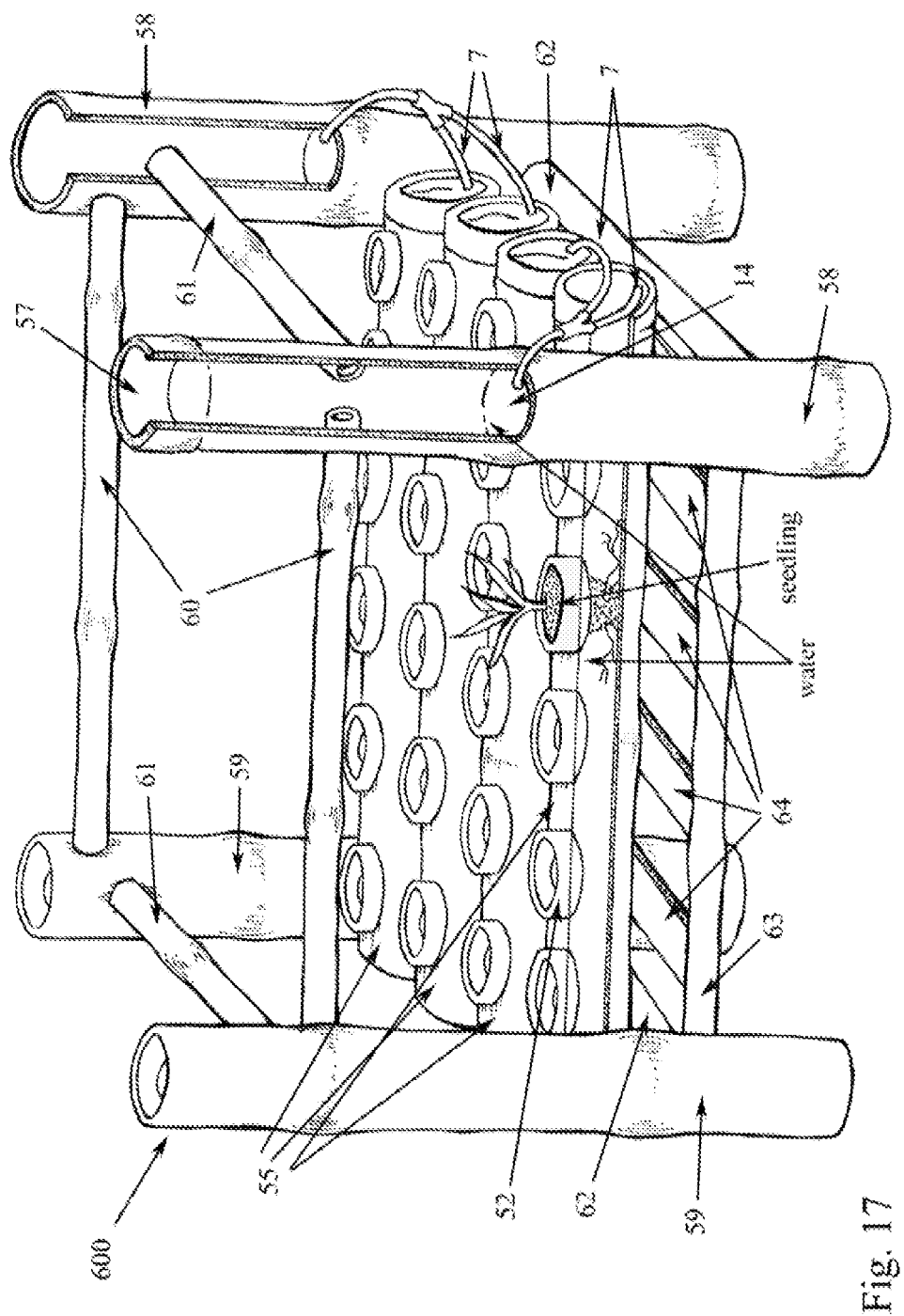
FIG. 17 depicts a vertical bamboo grow tower according to an embodiment of the present disclosure.
Figure 18A:
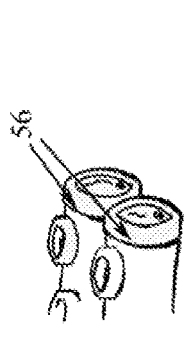
FIG. 18A depicts a stand for a bamboo grow tower according to an embodiment of the present disclosure.
Figure 18B:
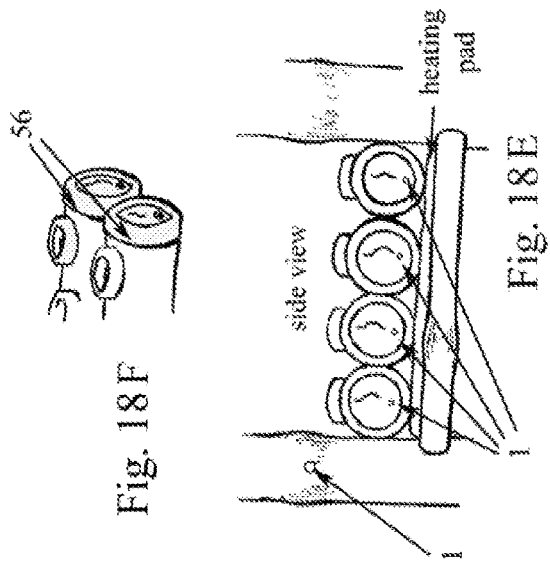
FIG. 18B depicts a bamboo rod for a bamboo grow tower according to an embodiment of the present disclosure.
Figure 18C:
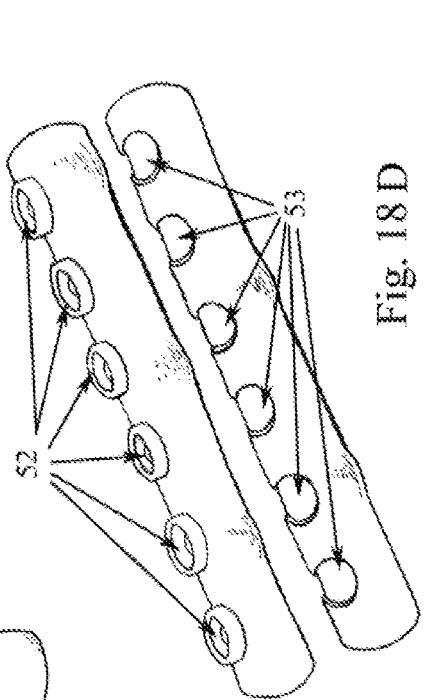
FIG. 18C depicts a grow cup for a bamboo grow tower according to an embodiment of the present disclosure.
Figure 18D:
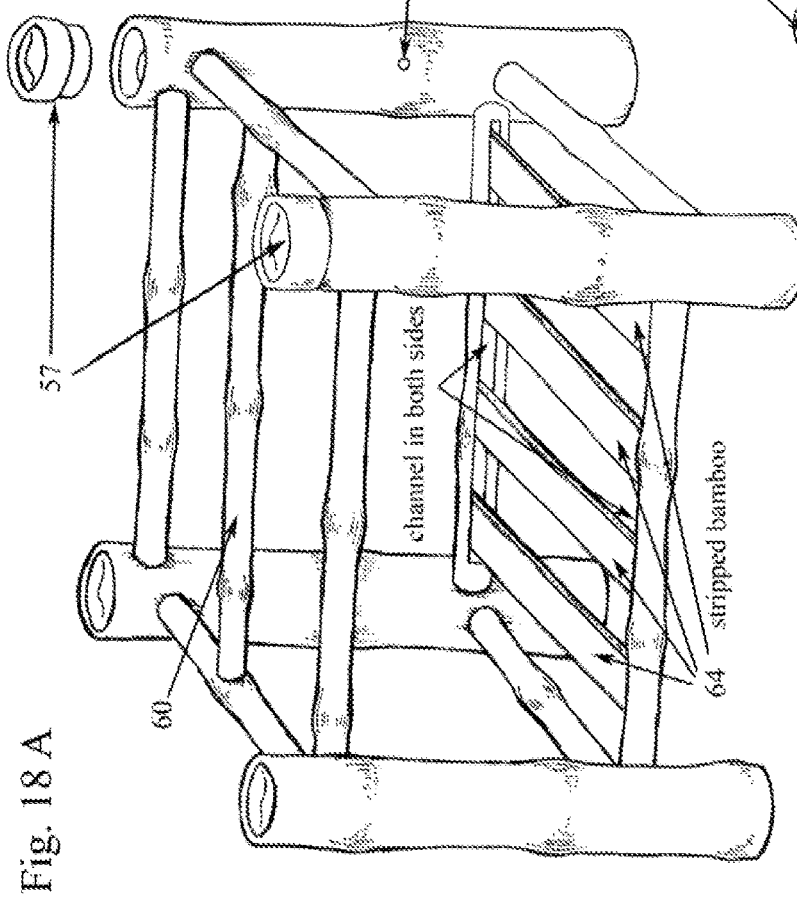
FIG. 18D depicts horizontal bamboo growers according to an embodiment of the present disclosure.
Figure 18E:
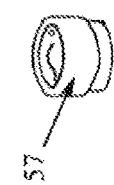
FIG. 18E depicts a side view of the horizontal bamboo growers according to an embodiment of the present disclosure.
Figure 18F:
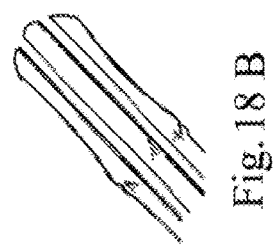
FIG. 18F depicts an end view of the horizontal bamboo growers according to an embodiment of the present disclosure.

Referring to FIGS. 15A and 15B, there is shown a wheeled platform 550 having foundation members 49, cross members 50, and floor strips 51 mounted on casters 29.

Referring to FIGS. 16, 17, and 18A-18F, there is depicted a bamboo grow stand 600 according to an embodiment of the present disclosure, where like reference numerals indicate like components. The stand 600 may include: seed starter grow plug cups 52, seed starter hold for grow plug cups 53, lid for seed starter water chamber 54, seed starter water chamber 55, rattan for fastening seed starter water chambers 56, lid for seed starter vertical gravity water feed chamber 57, vertical frame poles with water chamber for seed starter propagation kit 58, vertical frame poles without water chamber 59, cross member poles for seed starter propagation kit without floor channel 60, cross member poles for seed starter propagation kit 61, channels for flooring strips 62, cross member poles for seed starter propagation kit with floor channel 63, and floor channel strips for seed starter propagation kit 64.

Figure 19:
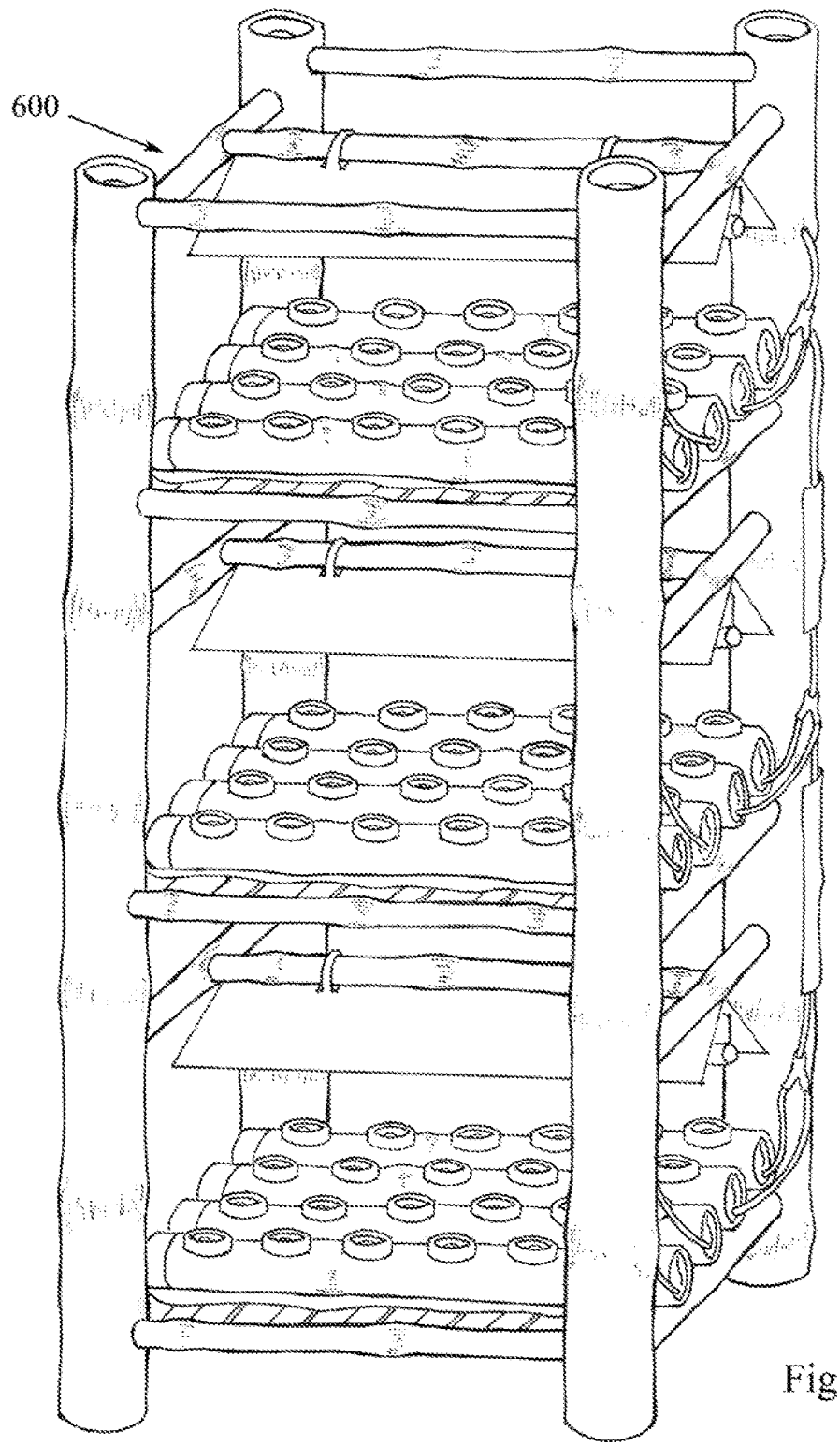
FIG. 19 depicts a vertical bamboo grow tower according to an embodiment of the present disclosure.
Figure 20:
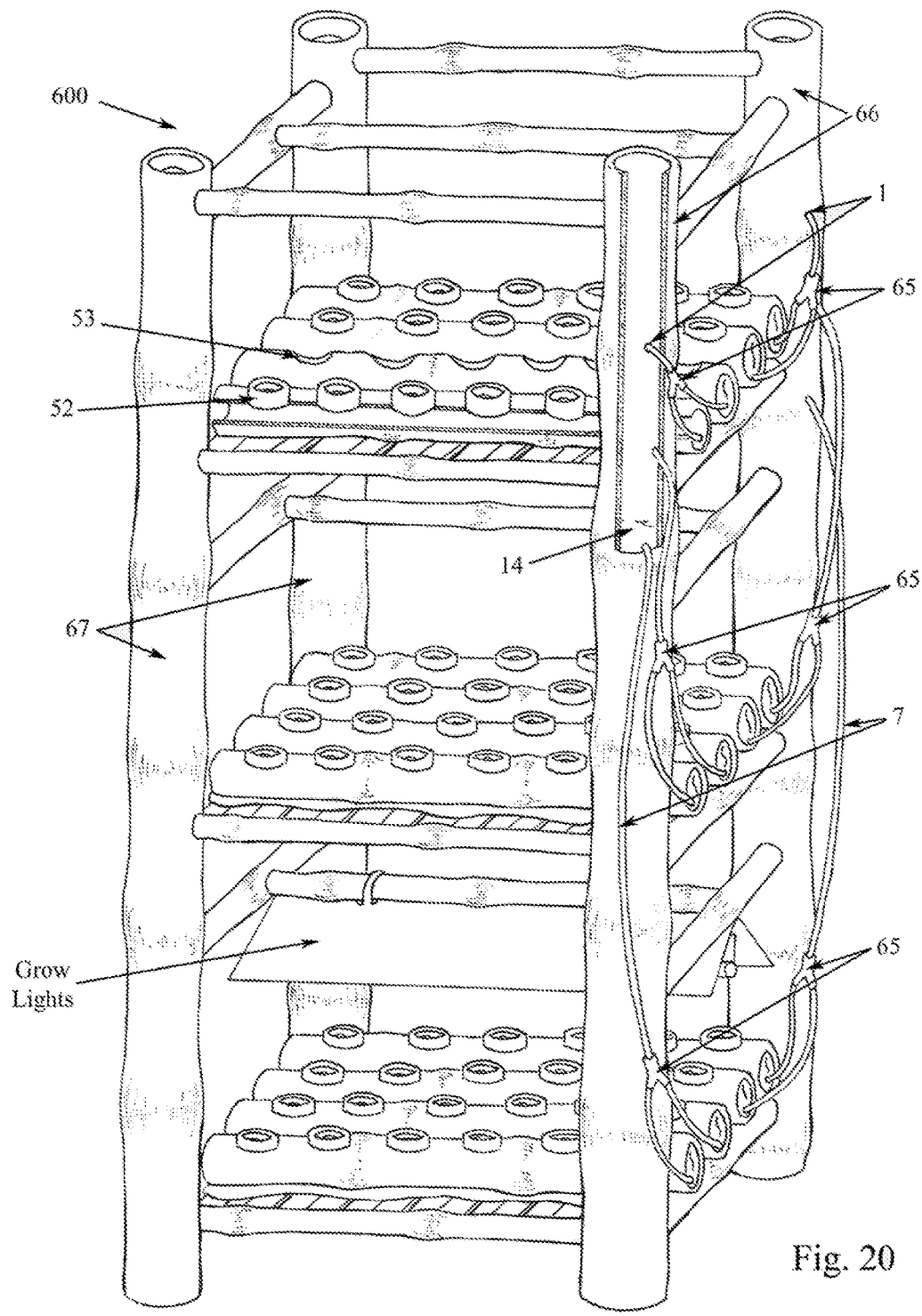
FIG. 20 depicts a horizontal bamboo grow tower according to an embodiment of the present disclosure.
Figure 21:
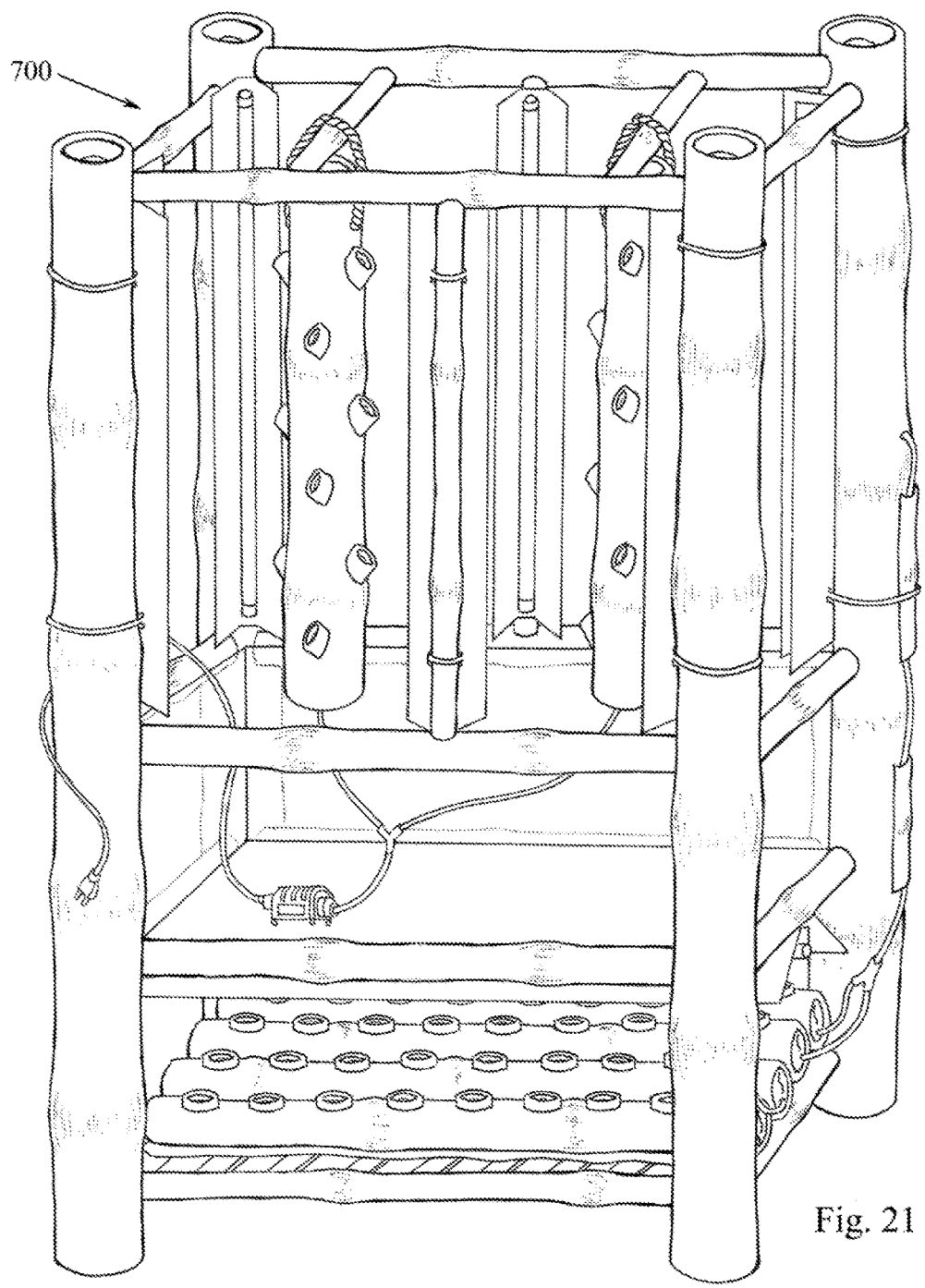
FIG. 21 depicts a vertical bamboo grow tower according to an embodiment of the present disclosure.
Figure 22:
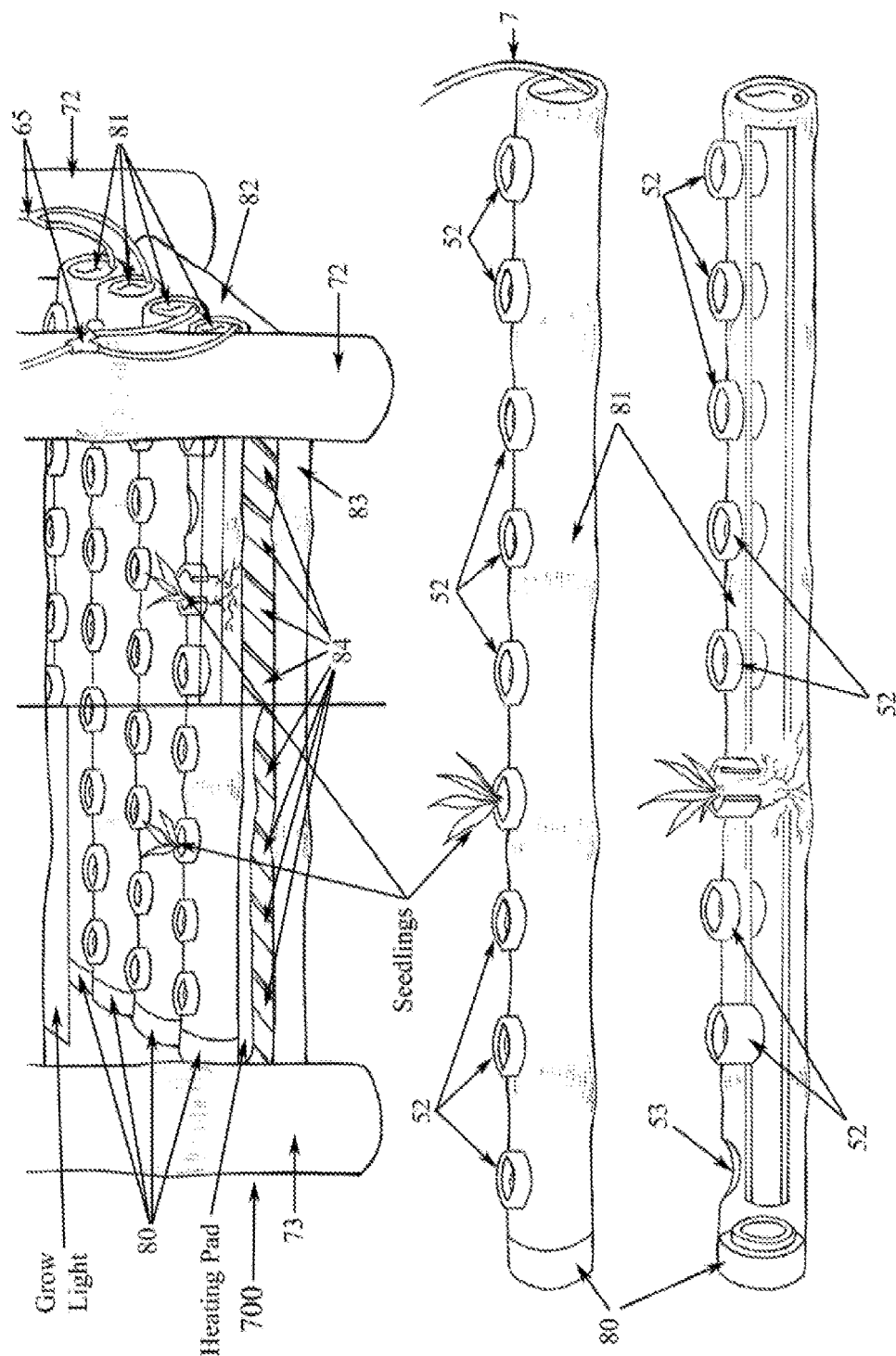
FIG. 22A depicts a vertical bamboo grow tower according to an embodiment of the present disclosure.
FIG. 22B depicts a horizontal bamboo growers according to an embodiment of the present disclosure.
Figure 23:
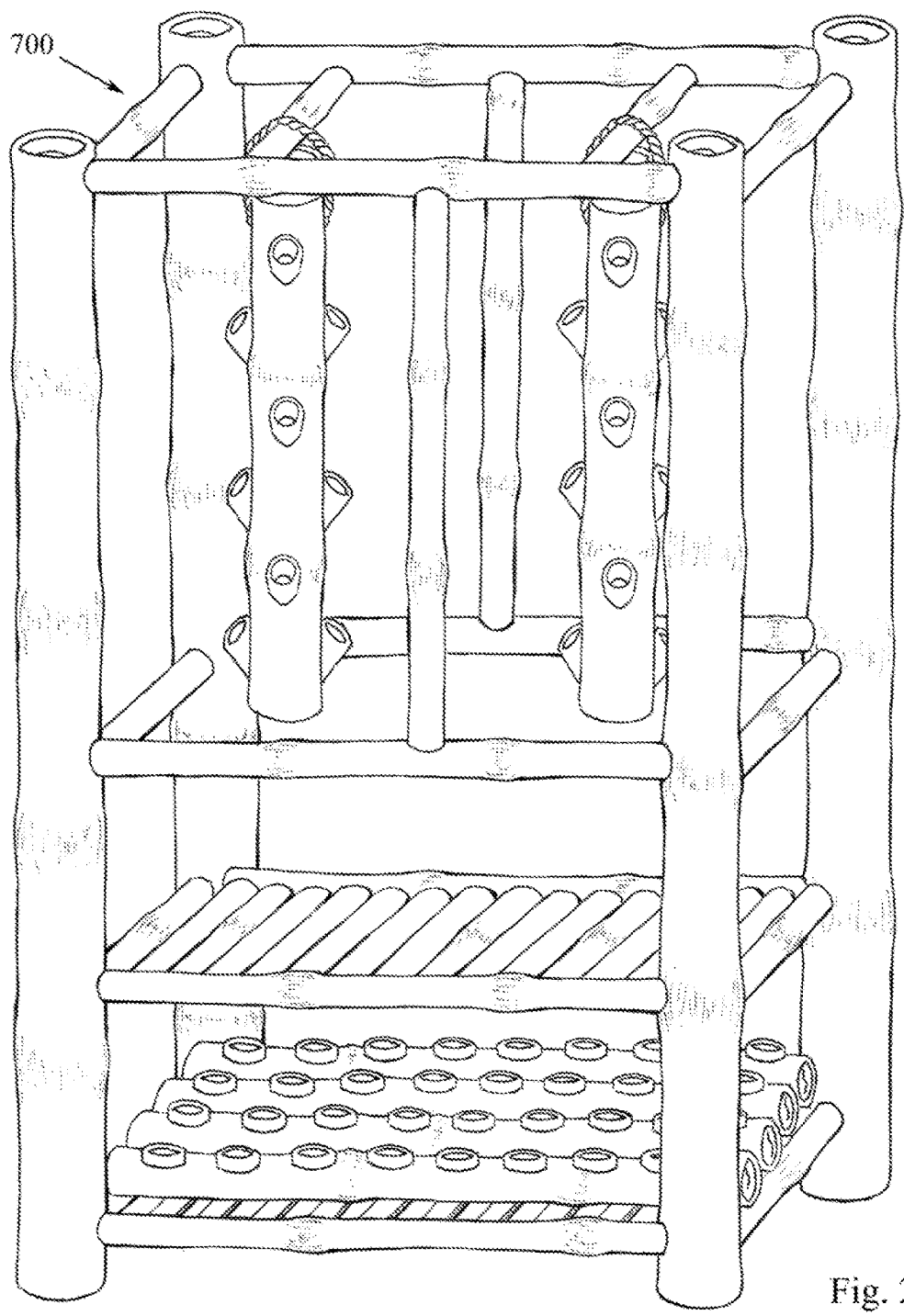
FIG. 23 depicts a vertical bamboo grow tower according to an embodiment of the present disclosure.

Referring now to FIGS. 19 and 20, there is depicted a stand 600 according to an embodiment of the present disclosure, where like reference numerals depict like components. The stand 600 may comprise: Y splitter for tubing 65, double water chamber for 3-level seed starter kit 66, and vertical frame poles without water chamber for 3-level seed starter kit 67.

Referring now to FIGS. 21, 22A, 22B, and 23, there is depicted a bamboo stand 700 according to an embodiment of the present disclosure, where like reference numerals depict like components. The stand 700 may comprise: half round bamboo for gravity feed tube guides 68, cross members 69, cross members 70, light hanging bar 71, vertical frame poles with water chamber 72, vertical frame poles without water chamber 73, hand rail cross member 74, hand rail cross member 75, coco lumber 76, cross member for the fish tank platform 77, cross member for the fish tank platform 78, flooring strips for fish tank platform 79, lid for grow plug water chamber 80, water chambers for grow plugs 81, propagation platform 82, propagation platform 83, and half round floor strips for propagation platform 84.

Figure 24:
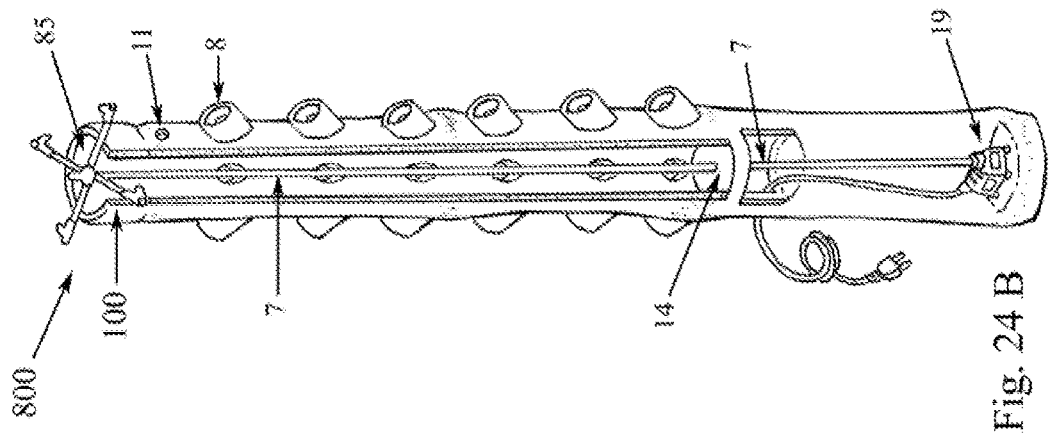
FIG. 24A depicts a vertical bamboo grow tower according to an embodiment of the present disclosure.
FIG. 24B depicts a vertical bamboo grow tower according to an embodiment of the present disclosure.
Figure 24:
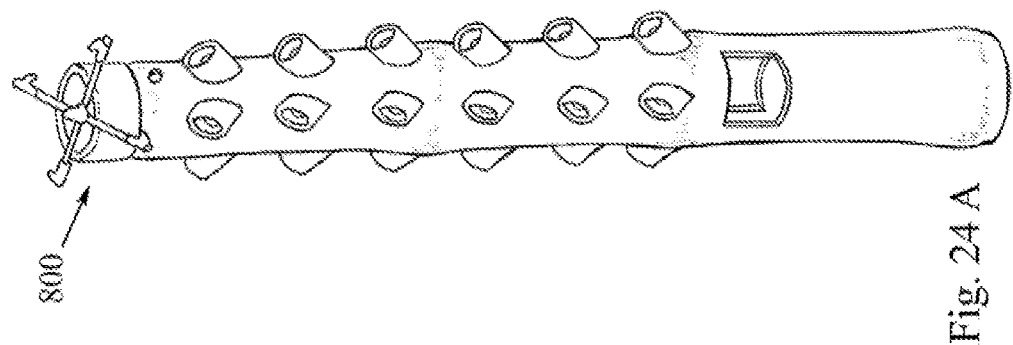

FIGS. 24A and 24B depict a hydroponic system 800 according to an embodiment of the present disclosure, where like reference numerals depict like components. The hydroponic system 800 may include a mistering adapter 85. In this regard, the pump 19 may provide water to the mistering adapter 85 which sprays a mist onto the plants in the grow cups 8. The tower may be filled with substrate, such as coffee grounds. The system 800 may be particularly suited for growing mushrooms.

The steps of building a bamboo vertical grow tower will now be described. It will be appreciated that the dimensions are for reference only, and that variations in the dimensions fall within the scope of the present disclosure.

1. Harvesting: When the bamboo is harvested, it will be measured according to its outer diameter of an average of 4½ to 5 inches, and it inner diameter is approximately 1 inch less in size. Lengths varying from 3 to 8 feet for the main tower section. For the grow holes, long straight poles of bamboo are cut and harvested at 1½ to 2 inches in diameter, they are also skinned and dried the same way. The smaller leftover sections may be used for stands and cages.

2. Shaving, sizing and drying: The bamboo is then cut into different lengths based on the desired dimensions and grow hole configuration. A hand saw or a chop saw with a fine blade can be used for this process. The bamboo's skin will be shaved-off and are dried in a shaded space for building a shipping container for up to two weeks depending on the saturation of the bamboo. After the drying process is complete, the towers are cut to size. If the tower will have a built in water chamber, cut using the larger nodes/hollow sections as the bottom of the tower, meaning the larger chambers are used for the water chambers. If it is an aqua-ponics tower, they can be cut anywhere on the bamboo because these towers are built exactly the same, other than they are hollow all the way through so they can be used over a fish tank or a grow bed or larger pots.

3. Cap/Lid: The upper part of the bamboo towers (with bamboo knuckle/node) are cut 3½ inches from the top, which is 2 inches above the top of the dome of the node, which leaves 1½ inch down from node, for the flange to be glued to. This 2 inches left above is to eliminate splashing as the water flows onto the cap from the ⅜ inch tubing. The nodes/knuckles of the bamboo are water tight and run about every 16 to 18 inches in length, and they are naturally concave to create a bowl or a dome depending on the direction. The dome side of the node is used for the lid so that the water will naturally flow to the outside of the cap to the rain holes.

Then a bamboo section, approximately 2 to 3 inches in diameter an 2 inches in length, half of it is inserted inside the 3" cut piece for the lid and they are glued together, the other half hangs down as a flange to fit inside the top of the tower. Then its rough edges will be sanded and or shaved slightly to match the inner shape of the tower that it is covering. Then a ⅜ inch hole is drilled in the center of the top of the dome of the node for the water tubing to be pulled through. Then in the valley of the top of the node, six ⅜ inch holes are drilled for the water to rain back down the tower. Finally six 2×⅜ inch small sticks of hollow bamboo are cut to fit in the drain holes to direct the water downward in a raining fashion, rather than letting the water follow the contour of the interior of the bamboo. Plastic or metal down spouts are an option for this as well. The raining of water over the roots is called Aeroponics.

4. Hollowing and Cleaning Towers: Then the bamboo will be hollowed out with a specially designed tool, which is made from a 3¼ inch round drill bit, and a series of 2-foot drill bit extensions that Allen wrench together end to end to create a long drill shaft according to the size of the tower that is being constructed. Then the inner nodes between the top/cap and bottom of the grow tower/bottom node are removed/drilled out. This means we have a cap with node, a very bottom of tower with node, and the first node above the bottom still intact, and the rest of the nodes between are removed. Finally the inside of the bamboo is cleaned of loose debris, using the same drill bit extenders and a 3 inch steel brush circular bit, a hose with pressure is used to spray out the dust and loose debris that is removed with the wire brush circular sander bit.

5. Grow Holes and Grow Chamber: At the top of the grow tower with the lid off, mark with a straight edge the four sides of the tower, meaning like the cross hairs of a rifle scope we make a cross denoting the four sides, then with a chalk line we make a straight line down each side of the outside of the tower. We then measure 2 inch down from the top of the tower (not the lid), to find and mark the top of where the first grow hole will start. The bottom two grow holes/hole is kept 3 inches from the bottom of the grow chambers node. The 1½ to 2 inches bamboo poles are then cut on a 45 degree angle on one end and a straight cut on the other side measuring from outside of the grow hole to the top of the long point of the 45 degree cut approximately 3¾ inches to the short side of the 45 degree cut. This is also done using a hand saw or a chop saw with fine teeth. We make many different grow hole options, from opposing or staggered on just two sides for window growers, and full configuration meaning holes on all four sides of the tower, spaced on an average of 10 to 12 inches apart. Oval holes are traced along the chalk lines based on the configuration, using the actual cup that will be inserted into that hole. The holes for the cups to be glued into are traced and hand chiseled on a 45 degree angle using custom rounded bamboo chisels by hand. Once the holes are chiseled, the 45 degree grow cups are glued to the inside of the chiseled holes. Inserting a hammer or heavy pipe into the freshly glued cup assures that it stays tight to the top of the hole, as the glue dries. This process is repeated for all sides with grow holes. The excess glue is whipped off with a wet towel.

6. Water Chamber: Directly under the node at the bottom of the grow chamber a line is traced around the tower with a thin piece of bamboo that bends around the tower, on two opposing sides of the tower, from the top of the line traced around the tower, centered on each side is a 1½ inch horizontal line, then we measure down 4¼ inches and make another 1½ inch thick line, then we trace a line from the bottom marks to the top marks, creating a pillar on each side that is 1½" thick and 4¼" tall. Then from the bottom of the pillars we trace another line all the way around the tower. This creates two windows on each side, measuring approximately 3½ inches wide by 4¼ inches high that are cut out with a hand saw and a chisel, leaving only the two pillars on each side and a window on the other two sides. This creates our water chambers (We can do it with just one window on one side leaving the other side intact. We do this for the taller towers for addition strength. We then sand the top of the window and the bottom of the window edges, in a 45 degree angle to lead any water dripping or splashing back in towards the water chamber. We are the only vertical growing system to use a natural substance as the grow tower and medium. We are the only vertical grow system that stores the water inside itself. Making it a fully self-contained tower that can be hung anywhere or placed in a base.

7. Sanding and Branding: Now we give the body or the towers a final hand sanding with 120 grit sand paper getting rid of any excess glue or rough areas, then a final sanding with fine steel wool prepares the body for shellac. The rough areas like the top of the lid/cap and the outer edges of the grow holes and the bottom of the tower itself, are sanded with a 120 round sanding bit in a powered screw gun or drill. This takes off all the rough edges and gives the edges of the towers a rounded and smooth effect to the touch. Now the towers are ready to be finished with a sealer.

8. Shellac Finish: SHELLAC the word is commonly used refers to all forms of purified lac—a natural resin secreted by the tiny lac insect on certain trees, principally in India and Thailand. The towers are forwarded to the shellac-ing phase; where three heavy coats of are sprayed with a high pressure low volume (HPLV) spray gun with a naturally and traditionally mixed shellac; with a ratio of 2 gallons of 95% ethyl alcohol by 1 pound of natural de waxed blonde shellac flakes. The Shellac will give the bamboo a natural shine and define its beautiful features, as well a water proofing the exterior 9. Drilling Holes for Tubing and Hanging Rope: We measure down 1 inch from the top of the grow chamber and drill two opposing holes on a 45 degree downward angle to direct water back into the tower, to avoid leaks from the rope holes. Then on the underside of the grow chambers bottom node, we drill first a ⅜ inch hole in the center of the underside of the dome, so this is the concaved underside of the node directly above the water chamber window. A small ⅜ inch round by 1 inch long bamboo or piece of tubing slides up into the hole, and hangs inch below the hole and inch up into the grow chamber. This helps the water drain in a direct stream down into the water chamber below, rather than letting the water follow the contour of the bamboo. This creates a nice fountain sound and prevents leaking. Next another ⅜ inch hole is drilled on the far right or left side, directly under one of the pillars of the underside of the same node that the water return hole was just drilled. This hole is for the ⅜ inch tubing that is attached to the pump inside the water chamber to slide though and up through the tower and out of the top center hole in the lid/cap. The tubing will be cut to stick out ½ inch of the top hole.

10. Installing Pump and Hosing: A ⅜ inch hose cut approximately 1 foot larger than the tower that it is serving is inserted in the off centered hole on the underside of the grow chamber node that was drilled. The hose is fed up through the inside of the tower and out of the center hole of the dome on the tip node of the lid/cap, Leaving about a inch sticking out of the top of the dome of the lid node. Then the other end of the ⅜ inch tubing is inserted into the ⅜ inch hole on the low voltage pump that is then lowered and submerged in the bottom of the water chamber, and will pump the water up to the top where it will rain down through the roots and out of the center water return tube in the bottom grow chamber node.

11. Planting Grow Plugs: Grows plugs with a sprouted seedling and roots hanging out from the bottom of the plug are inserted into the grow hole, using a chop stick to hold and guide the hanging roots up and into the grow chamber. Then the grow plug measuring 2½ inches in diameter fits snug into the grow hole.

The steps of building a bamboo base for a vertical grow tower will now be described. It will be appreciated that the dimensions are for reference only, and that variations in the dimensions fall within the scope of the present disclosure.

1. Pyramid Base: We have an optional base/stand for the towers. These are built in the shape of a pyramid, pyramids have many mysterious energetic qualities, as well as being the strongest geometrical form.

2. Foundation of the Base: First we cut two 3 inch diameter bamboo poles at a length of 24 inch. Then we take two 2½ inch diameter bamboo poles that are 2½ inch in diameter and cut them to a length of 28 inch. Then at each end of the 3 inch×24 inch poles we trace the round ends of the 2½ inch poles in the center of the ends of the 3 inch poles so that the 2½ inch poles can slide approx. 2 inch inside the holes to create our approx. 2'×2' foundation for the base. Then we cut two 2¼ inch diameter poles at a length of 22 inch, then on the two 2½ inch foundation poles we measure in from center point of the inside dimension 3 inch in both direction creating a 6 inch distance between the two marks. Then we mark with the round 2¼ inch pole ends a hole at each 3 inch mark from the center. These holes are chiseled out and the 2¼ inch poles slide into these holes creating a 6 inch rectangle going across the entire foundation, then two more 1½ inch poles are cut at a length of 8 inch. We then measure out from the center of the 2¼ inch poles 3 inch in both directions and make a mark for each. We then trace the ends of the 1½ inch poles at each mark and chisel out the hole so the 1½ inch can slide inside the holes creating a 6 inch square in the center for the foundation for the bottom of the tower to fit in and to hold it sturdy. We then take 1 inch strips of bamboo that is made by splitting a 2 inch bamboo pole with a knife down the middle from top to bottom in a cross pattern creating 4 separate strips that can be used for flooring and wall covering. We now glue and nail all the base pieces into place and then take the strips and nail them to the underside of the 6 inch×6 inch square in the center of the base, creating a floor for the tower to sit on. So if the client wants to have wheels on his base he can roll it around unimpeded.

3. Building the Pyramid: Next we take 4-1½ inch bamboo poles and cut them at a length of 24 inch these will serve as our four sides of the pyramid. We then measure in from the ends of the 3 inch foundation poles 4½ inch and trace a hole on the top of the foundation using the 1½ inch poles. We then chisel the holes on an approximately a 60 degree angle, so that the 4 pyramid poles can slide down in on that angle to the bottom of the 3 inch foundation poles. We then cut two 2½ inch diameter poles at a length of 8 inches then on the bottom of these 8 inch poles we trace approximately 1 inch in from the ends, the two angled pyramid poles, we then chisel on an approximately 60 degree angle holes on both pieces for the four pyramid poles to fit in. we then cut two 2 inch poles and cut them at a length of 7 inch. Then on the inside of the 2½ inch×8 inch top pieces we trace the 2 inch×8 inch pole ends 1½ inch in from the ends but on the inside edge of the piece rather than the bottom. These holes are chiseled for the 2 inch pieces to fit inside creating a approximately 6 inch×6 inch square centered at the top directly above the 6 inch×6 inch square on the foundation square of the base creating a pyramid shape and giving a channels for the shaft of the tower to fit into for sturdiness. The approximately height of the top of the pyramid is 20 inch. Everything is then glued and nailed together; the base is branded and shellacked with 3 coats.

4. (Optional on all bamboo bases and cages) Small wheels/casters: 1½ inch wheels that are welded to a small metal plate with four screw holes one at each corner can be fastened with 1½ inch wood screws to the four corners of the bottom of the base, so the towers can be wheeled around easily.

Our tomato base and cage option is built almost exactly the same as the above base with a few modifications. The main modification to the base itself is that instead of cutting our 3 inch foundation poles at a length of 24 inch we cut them at a length of 32 inch, this leaves us a 4 inch foundation for the cage poles to fit inside and hold sturdy on all four sides. So at this point we would have gone through all the steps of building a pyraboo base, except once again we leave 4 inch hanging out on the 3 inch diameter foundation poles. Then we cut four 2¼ inch poles at a length of 6.5 inch. We then trace the bottoms of those poles on the top center of the 4 inch extensions that we left on the 3 inch foundation pieces. We then chisel those holes out and slide the 6.5 inch vertical cage poles into the holes creating am approximately 6.5 inch tall cage. We then take and cut eight 1¼ inch poles at a length of 28 inch: long and additional eight 1¼ inch poles at a length of 26 inch. Then starting at approximately 2' from the bottom of the vertical cage poles we trace our horizontal holes for the 1¼ inch poles to fit into creating a ladder effect on all four sides. We then evenly spread out the horizontal cross poles between the top of the vertical poles and the 2' from the ground starting point. They are approximately 1' 2 inch apart as they go up. We stagger the cross members so the other two go in right above the other apposing two. The cross members are then glued and nailed inside the vertical poles and a cage is born. 4 inch tube led grow lights can be attached with a simple 6 inch long zip tie to the inside of the vertical cage poles facing the tower inside the base. The plants then grow to the lights for indoor growing.

1. Wheels/casters: (Optional on all bamboo bases and cages) 1½ inch Wheels that are welded to a small metal plate with four screw holes one at each corner can be fastened with 1½ inch wood screws to the four corners of the bottom of the base, so the towers can be wheeled around easily The steps of building a pyramid pot base for a vertical grow tower will now be described. It will be appreciated that the dimensions are for reference only, and that variations in the dimensions fall within the scope of the present disclosure.

1. Pyramid Pot Base: Our clay pots are for holding water. Our pots are made from 100% natural clay as well.

2. Dimensions and Casting: A form is made with a base of 2×2 feet squared and in the center of the floor/base is a flange that sticks up in a circle, it is ¾ inch thick, 2 inches high and 6 inches in circumference, its purpose is to hold the bottom of the bamboo tower from sliding from side to side. The four sides of the pyramid are on an approximately 33 degree angle and they go up until the rim of the base is approximately 16.5 inch high from the base to the rim, leaving the square opening to the water chamber at approximately 10 inch×10 inch. We then create a 1.5 inch hole for the pump plug to fit though at the top of the water chamber 1.5 inch below the rim. The clay is then poured into the casting and then put into a kiln to harden. Once it is hard the cast is take off and the pot is lightly sanded to rid of clumps of clay and the outside is then either sealed or painted and then sealed.

3. Lid/cap Dimensions and Casting: The lid is cast into two separate pieces that are designed to squeeze around the shaft of the tower, keeping it from swaying side to side as well as giving easy access to the water chamber below. The lid cast is 10 inch at the base and rises up 4 inch in the same angle as the base creating the top of the pyramid. The top of the lid is 8 inch squared when both pieces are put together; there is a 1 inch flange that sticks down at the bottom of the lid so that when both pieces are put together like a puzzle piece, the flange sits down inside the rim of the water chamber below creating a snug fit. Also when pieces are put together the there is a half circle on each piece of the lid in the center that is a 3 inch half round and when put together they create a 6 inch barrier around the tower that is sitting in the bottom chamber, now the tower is secured in two points with a pyramid structure filled with water making them very stable and freestanding. The caps are cast and dried and finished in a kiln in the same fashion as the water chamber.

The steps of building a bamboo platforms and cases will now be described. It will be appreciated that the dimensions are for reference only, and that variations in the dimensions fall within the scope of the present disclosure.

1. Platforms and Cages: Our cage is built very similar to our pyramid base and cage, but rather than building the bamboo structured pyramid to hold the tower, it is a platform designed to hold the pot or any other pot for that matter, and unlike the cage above it also has a hanging bar at the top so the tower can hang directly from the cage if they are using an opened top pot of their own.

2. Platform: To build our platform, we start by cutting two 3 inch diameter bamboo poles 30 inch in length, and two 2½ inch×28 inch poles. Then 1 inch from the four ends of the 3 inch poles we trace the ends of our 2.5 inch poles in the center of the 3 inch pole. Then we chisel the four holes and insert the 2½ inch poles inside, creating a 24 inch square in the middle of the four poles creating the square. Then we mark the center of the inside of the 3 inch poles and snap a chalk line. We then chisel out a 1 inch channel from inside corner to inside corner, we then take 2 inch bamboo poles and split them in half creating two 1 inch half round pieces. These pieces slide inside the channels that are chiseled to create a sturdy platform. Then we glue and nail it all together creating a platform. 1.5 inch wheels mounted on 2 inch×3 inch steel plates are then screwed to the bottom four corners of the platform.

3. Pot with Cage: When building the cage, the platform is built exactly like the platform above, but again we extend our 3 inch foundation poles, from 30 inch to 32 inch. We then cut four 2¼ inch diameter poles at 6.5 inch in length. These are once again our vertical cage poles. We then cut 8 cross members at 30 inch×1¼ inch and 8 cross members at 28 inch×1¼ inch. Then we measure up from the platform 2' and make a mark, this is where our first four cross members will start. We then trace the ends of the 30 inch poles on the inside of the vertical poles and then just above going the shorter sides direction we trace the 28 inch cross member poles on the vertical poles. Every approximately 1' 3 inch we repeat the process, creating a ladder/cage effect up the vertical poles. We then glue and nail it all together. Finally we build the hanging bar for the top. We then cut four 1½ inch poles at 11 inch in length and one pole at 2½ inch×8 inch in length. Then 2 inch form top of the four vertical poles we mark the ends of the 1½ inch poles and chisel at a 22 degree angle and insert the four 1½ inch poles into the holes on that angle. Then we take the 2½ inch×8 inch pole and mark the top ends of the 1½ inch angled poles on the bottom four corners of you will of that pole. Then we chisel those out on the same 22 degree angle and insert the tops of the angle poles inside creating a hanging bar at the top of the cage, so the cage can be used with a free standing open top pot as well as with our base. The total height is 7 feet finally we glue and nail everything together and it is done.

4. Small wheels/casters: (Optional on all bamboo bases and cages) 1½ inch Wheels that are welded to a small metal plate with four screw holes one at each corner can be fastened with 1½ inch wood screws to the four corners of the bottom of the base platform, so the towers can be wheeled around easily.

The steps of building a seed propagation kit will now be described. It will be appreciated that the dimensions are for reference only, and that variations in the dimensions fall within the scope of the present disclosure.

1. Seed Propagation kit: In order to grow using vertical Hydroponics/Aeroponics grow towers, it requires Hydroponic seed starters. There are many different kinds, IE. Rock Wool, Clay Pellets, Recycled Glass, coco fiber, etc. We have found the cleanest and most natural way is using what is called a natural sponge grow plug, it is a mixture of natural substances meshed t together in a rubber sponge like material. We have found a custom sized plug to fit directly into our towers grow holes, making it the most user friendly planting system to date. For this reason we have invented a custom bamboo self-watering, self-sustained seed propagation kit. We make a 2' wide version and a 4' wide version. We make them in a single level kit or a three level shelf kit.

2. Making Frame and shelf/Platform: (The One Level Kit when done measures approximately 24 inches long×20 inches deep and 24 inches tall). The first step is we take four 4 inch diameter bamboo poles, and we leave a full node to node chamber and then measure down 6 inches below that into the chamber below and make a mark, we then cut them using a chop saw or a hand saw once again, making them an average of 24 inch long. We then measure down 2½ and cut off the tops of two of these vertical poles, we then cut a 3½ inch around by 1¾ inch high flange to fit inside the lids and to fit inside the grow plug tubes, making it water tight again. This gives us access to clean the grow plug tubes as needed the full node or chamber above on one side will be used as a water chamber to gravity feed down to the grow plug water chambers. Then we cut four 2 inches diameter poles at a length of 28 inches and four 2 inches diameter poles at length of 22 inches we then measure 3 inches up from the bottom of the 4 inches vertical poles and mark the ends of the 22 inches and 28 inches poles, and then chisel a hole for the cross member's to fit inside, creating a rectangle platform, then we measure 19½ inch up the vertical poles from there and mark the other 4 cross member poles creating a 24 inch by 21 inch inside dimension of the rectangle frame. The cross member pole that fits inside the water chamber side will be cut with the node still intact so that water doesn't leak into the cross members. We then split 1 inch poles in half to make two half round pieces that are used as the floor or platform for the grow plug tubes to sit on. Then on the 18 inch side of the floor a ½ inch channel is chiseled out making a place for the half round pieces to slide into to make the floor. Finally we cut a 2-1 inch diameter poles of bamboo at 23 inch then we trace the ends of these poles in the center of each half of the shorter top cross member poles on the inside edge. We then chisel out the holes so the 1 inch poles will slide inside the holes creating light mounting poles going over the center of the top of each seed starter chambers. Everything is then glued and nailed together.

3. Building Grow Plug Chambers: For the chambers we first create access lids, we take and cut four bamboo poles at 3½ inches in diameter and 24 inches in length using a chop saw or hand saw. On one end we then cut off just below the node approximately 1½ inches, and then we cut a flange piece for the lid that is 2½ inches in diameter and shave sand and fit it in to the underside of the lid with wood glue, creating our lid. Then we snap a chalk line down one side of the poles. Then we cut a 1½ inches diameter pole at a length of 2 inches long. We then trace these 2 inch pieces along our chalk line on our four poles creating 6 equal grow plug seed starter holes along the one side. We then chisel these holes out so that our 1 inch pieces can be glued into the hole leaving approximately ¼ inches protruding out of the top of the hole and the remainder protrudes down inside the chamber. We then glue all the grow plug cups in place. We then take rattan, which is used to fasten bamboo furniture together firmly. It is thin strong flexible material that is approximately ¼ inches wide and comes in spools that are hundreds of feet long. We take rattan and two of the 24 inches grow plug chambers and in a figure eight fashion we secure two together at each end. This will allow the chambers to sit flat and yet still be modular to move around and clean. Also a heating pad will sit underneath the chambers to keep the water warm. Seeds need heat and moisture to propagate quickly. After they sprout they need light to continue to grow. We repeater the process with the other two chambers. These chambers will now sit flat on the bottom platform of the kit.

4. Drilling Holes and running tubing: This system is a gravity fed self-watering system. Meaning we use of the water chamber on the vertical poles to hold the water and the gravity of the water will fill the bottom ½ inch of the grow plug chambers; one vertical water chamber feeds two of our grow plug chambers at a time. The water feeds down through a ⅜ inch hosing that is drilled in the bottom of the vertical water chamber, then it Is split with a y splitter and then each end is fed into the same end of each of the grow plug chambers that are fastened together with rattan.

At the bottom of each grow chamber we drill a ⅜ inch hole, then on the non-cap/lid end of the 24 inch×3½ inch grow chamber poles we drill a ⅜ inch hole at the bottom of the node making the top of the hole approximately ½ inch up from the floor of the inside of the chambers. We then measure and cut the ⅜ inch tubing to slide into the holes at the bottom of the vertical water delivery chambers and we cut and attach a y splitter to the hose and attach two more hoses to that. These other two hoses slide into the ⅜ inch holes on the end of each horizontal grow plug water chamber. One the water fills the bottom of each chamber up to the top of the deliver hose, it stops filling, and as soon as the water level drops below the top of the tubing that is feeding the water is will fill back up to cover the hole and stop again, similar to the way a toilet works. This process will keep approximately ½ inch of water in the bottom of the grow plug chambers for the roots to pull nutrients from and plenty of oxygen above for the roots as well. Roots need an equal amount of both.

5. Grow Light: Finally we install the grow light. This is done by simply fastening a 2' long 1½ inch round LED or fluorescent tube grow light to the light bar using 6 inch long zip ties. Also propagation heating mat is placed on the platform under the grow plug chambers.

The steps of building a bamboo base for a vertical grow tower and fish tank will now be described. It will be appreciated that the dimensions are for reference only, and that variations in the dimensions fall within the scope of the present disclosure.

1. 55 to 90 gallon fish tanks: (We can custom build these and will be building a smaller version for 36 inch width tanks same design just 12 inch smaller and only one tower) What is Aquaponics? It is the use of fish culture meaning fish poop to feed your plants in a hydroponics system rather than having to add nutrients to the water. This is the only complete home system that it made from 100% natural bamboo. It doubles as a piece of furniture, a fountain, and a piece of artwork, on top of being the only complete Indoor/Outdoor home Aquaponics system available. We are the first and only to use one again the natural water tight chambers and features of bamboo to our advantage. The gravity fed propagation kit at the bottom, not only holds water, but is also fed using the top chambers of the vertical pillar poles that hold up the system. Making it a very unique self-sustained all in one Aquaponics system made entirely from bamboo. Final dimensions of the kits are approximately 4.5' wide×7.5' high×24 inch deep 2. Building the Frame and Platforms:

2a. Propagation platform: First we cut, and skin 4 bamboo poles @ 7.5' long×4½ inch in diameter (vertical poles), the top of these being cut just above a node section, leaving the upper two top nodes sealed. We then make a lid on two of these vertical poles, by cutting 1½ inch under the top node of two poles, and then cutting two flange pieces approximately 3½ inch to fit snug inside the cap and the top of the tower, are glued together to create the cap. We then using a 3½ inch round drill bit we remove the first inside node from the two right side vertical pillars, creating a double node water chamber. Those will now become the water chambers for the gravity fed propagation kit below. Then we cut and skin 2 poles @ 2½ inch in diameter×46 inch in length and 2 more poles @ 2½ inch in diameter×22 inch in length. These four poles will serve as the frame for the bottom platform that is used for the propagation kit. We then measure up 3 inch from the bottom of the 4 vertical 4½ inch poles and trace the ends of the four platform frame poles on the inside center of the vertical poles. We then chisel these holes out so the platform poles can slide in. We then take a 2 inch diameter pole and split it in half, this makes our flooring pieces. Then on the inside edge of the 46 inch long poles we chisel a channel inch thick along the inside edge of both poles. This channel is for our floor/platform for our propagation systems to sit on as well as the propagation heating mat. For the floor pieces we take 2 inch poles and split them from one end to the other down the middle, creating a half round strip. These strips are inserted into the channel creating the floor.

2b. Building the Fish Tank Platform: Next we measure 16 inch up from the propagation platform, and make a mark on all four of the vertical frame poles. This is where the platform for the fish tank will start. We then cut 2 more poles @ 48 inch in length×3½ inch in diameter and 2 poles @ 23 inch in length×2½ inch in diameter. These will serve as the outer frame of the fish tank platform. We then cut 2 pieces of coco lumber that are 1 inch×2 inch×48 inch, these will serve as extra support for the cross members on the fish tank platform. Then on the two 48 inch platform poles we create 1 inch channel for the flooring strips to slide into. We then mark the ends of the coco lumber on the vertical pillar poles so that the coco lumber pieces slide into he vertical poles flush with the bottom edge of the 1 inch channel. This way the flooring strips will sit on the coco lumber and inside the cross member bamboo for extra strength. We then measure up the vertical pillars 24 inch above the fish tank platform and this will be the top of our hand rail that is even in height with the top of the fish tank. We then cut 2 poles @ 3½ inch in diameter×48 inch long and 2 poles @ 3½ inch diameter×23 inch long. We then mark the ends of these poles using the mark that we made 24 inch above the fish tank platform as the top of the hand rail cross members. We then chisel that out so the hand rail can fit inside.

2c. Building the top cage section for hanging towers and lights: We then cut two poles @ 2½ inch in diameter× 48 inch long and 2 more @ 2½ inch in diameter×23 inch long, and 2 more poles @ 1½ inch in diameter×23 inch long. We then make a mark just under the top of the vertical poles, and then we scribe the ends of the 2½ inch poles in the center of the inside edge creating rectangle frame at the top. We then chisel those holes out for the top frame poles to fit in. then we font the center point of the 48 inch top cross bar and then we measure 12 inch in both directions from the center point, making a mark on the inside edges using the 1½ inch×23 inch cross member poles we scribe those and chisel those out the holes so they can fit inside. These act as our hanging bars for the towers that will hang over the fish tank. We then cut 2 poles @ 1½ inch diameter×4' long. We then fond the center point of the hand rail 48 inch cross members and the 48 inch top bar cross members and we scribe and chisel the 1½ inch× 48 inch poles that we cut last so they can fit inside. These will serve as a vertical pole to hang grow lights on. Now we can glue and nail the whole structure together.

2d. Building the seed starter grow chamber and drilling holes and running tubing: We next cut 4 poles @ 3½ inch in diameter×48 inch long. Then we cut on one end just below the end node we cut that off to create the lid. We then create a flange to fit inside the lid and inside the end of the poles to hold the cap on tight. Then we chalk a line down one side of all four poles. Then we cut 48 grow cups that are 2 inch long, we then trace those equally along the chalk lines creating 48 total grow plug holes. We chisel out all those holes and glue the grow cups in place leaving a inch flange hanging outside the grow chamber. We then rattan the 48 inch grow plug water chambers together in two's. So they can lay flat without rolling yet remain modular. Finally we drill a ⅜ inch hole in the bottom of the second node section down from the top of the vertical pillars that have the water chambers, for the tubing insert into. Then we drill a ⅜ inch hole at the very bottom of the node in the end of the four seedling water chambers on the opposite end of the lid, and then we place the chambers in place on the platform and put the heating mat under them. We then cut a 1½ inch pole and cut two pieces at a length of 10 inch.

Then we split those 10 inch poles in half. Leaving 4 half round pieces. Then we glue these pieces to the inside edges of the vertical poles in the middle of the node section below the water chamber. These serve as a hose guide for the tubing to run through to keep it organized. Finally we cut two pieces of pvc clear tubing at a length of approximately 3 inch. They we take our Y splitters and put them in the ends of the two tubes. Then we take the other end and insert them in the holes at the bottom of the water chambers on the vertical poles. Then we cut 4 pieces of clear pvc water tubing at a length of 12 inch, the we attach those to the ends of the Y splitter.

Finally we insert the 4 12 inch tubes into the ends of the grow plug water chambers. This will gravity feed the water until the water covers the end of the tube which is approximately inch from the bottom of the chamber. Then as the water is used and evaporated, and drops below the top of the tubing it will gravity feed until it fills up and covers the end of the tube again. Then finally a pump is put I the bottom of the fish tank and we cut a 20 inch piece of tubing attach a Y splitter to it and then run two tubes up through the middle of the towers so it can rain down the chambers with all that wonderful fish poop goodness.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A hydroponics plant growing system comprising:
a tower having a grow chamber and a water chamber formed therein;
a plurality of grow cups attached to a side of the tower adjacent the grow chamber, wherein each of the grow cups is formed from a tubular section extending between a first end and a second end, wherein the first end is cut at an angle;
cutouts in the side of the tower that form passageways between the grow cups and the grow chamber, wherein the cutouts have an oval shape and the first ends of the tubular sections are installed into the cutouts; and
a window formed into a sidewall of the tower to provide access to the water chamber;
wherein the tower is formed from a bamboo stem.

2. The system of claim 1, wherein the grow cups are formed from bamboo.

3. The system of claim 1, further comprising a node between the grow chamber and the water chamber.

4. The system of claim 1, further comprising an electric pump disposed in the water chamber.

5. The system of claim 4, further comprising a tube attached to an outlet of the pump and for directing water from the water chamber to a top of the grow chamber.

6. The system of claim 5, wherein the tube passes through a node disposed between the grow chamber and the water chamber.

7. The system of claim 6, further comprising a drain formed in the node.

8. The system of claim 1, further comprising a cap, wherein the cap is formed from a section of a bamboo stem, the cap having a node.

9. The system of claim 8, further comprising a plurality of down spouts formed in the node of the cap.

10. The system of claim 9, wherein the cap further comprises a flange configured and dimensioned to fit within the grow chamber of the tower.

11. The system of claim 10, wherein the cap further comprises a sidewall, wherein the sidewall and the node form a water reservoir.

12. The system of claim 1, further comprising a means for hanging the tower from a structure.

13. The system of claim 1, further comprising a bottom node, a middle node, and a top node, wherein the water chamber is disposed between the bottom node and the middle node; and wherein the grow chamber is disposed between the middle node and the top node.

14. The system of claim 1, further comprising at least one pillar disposed between the water chamber and the grow chamber.

15. The system of claim 1, further comprising a stand for supporting the tower.

16. A hydroponics plant growing system comprising:
a tower having a grow chamber and a water chamber formed therein;
a plurality of grow cups attached to a side of the tower adjacent the grow chamber, wherein each of the grow cups is formed from a tubular section extending between a first end and a second end, wherein the first end is cut at an angle;
cutouts in the side of the tower that form passageways between the grow cups and the grow chamber, wherein the cutouts have an oval shape and the first ends of the tubular sections are installed into the cutouts;
wherein the tower is formed from a bamboo stem;
wherein the grow cups are formed from bamboo;
a bamboo node separating the grow chamber and the water chamber;
a window formed into a sidewall of the tower to provide access to the water chamber;
an electric pump disposed in the water chamber;
a tube;
wherein the tube passes through the node disposed between the grow chamber and the water chamber;
a drain formed in the node disposed between the grow chamber and the water chamber;
a cap, wherein the cap is formed from a section of a bamboo stem, the cap having a node;
a plurality of down spouts formed in the node of the cap;
the cap further comprising a flange configured and dimensioned to fit within the grow chamber of the tower;
the cap further comprising a sidewall, wherein the sidewall and the node of the cap form a water reservoir;
the tube attached to an outlet of the pump and directing water from the water chamber to the water reservoir of the cap;
means for hanging the tower from a structure; and
at least one pillar disposed between the water chamber and the grow chamber.

17. A hydroponics plant growing system comprising:
a tower having a grow chamber and a water chamber formed therein;
a plurality of grow cups attached to a side of the tower adjacent the grow chamber, wherein each of the grow cups is formed from a tubular section extending between a first end and a second end, wherein the first end is cut at an angle;
cutouts in the side of the tower that form passageways between the grow cups and the grow chamber, wherein the cutouts have an oval shape and the first ends of the tubular sections are installed into the cutouts;
an electric pump disposed in the water chamber; and
a tube attached to an outlet of the pump and for directing water from the water chamber to a top of the grow chamber;
wherein the tube passes through a node disposed between the grow chamber and the water chamber;
wherein the tower is formed from a bamboo stem.

18. A hydroponics plant growing system comprising:
a tower having a grow chamber and a water chamber formed therein;
a plurality of grow cups attached to a side of the tower adjacent the grow chamber, wherein each of the grow cups is formed from a tubular section extending between a first end and a second end, wherein the first end is cut at an angle;
cutouts in the side of the tower that form passageways between the grow cups and the grow chamber, wherein the cutouts have an oval shape and the first ends of the tubular sections are installed into the cutouts; and
a cap;
wherein the cap is formed from a section of a bamboo stem, the cap having a node;
wherein the tower is formed from a bamboo stem.

19. A hydroponics plant growing system comprising:
a tower having a grow chamber and a water chamber formed therein;
a plurality of grow cups attached to a side of the tower adjacent the grow chamber, wherein each of the grow cups is formed from a tubular section extending between a first end and a second end, wherein the first end is cut at an angle;

cutouts in the side of the tower that form passageways between the grow cups and the grow chamber, wherein the cutouts have an oval shape and the first ends of the tubular sections are installed into the cutouts; and at least one pillar disposed between the water chamber and the grow chamber;

wherein the tower is formed from a bamboo stem.

* * * * *